United States Patent
Miyashita et al.

(10) Patent No.: US 7,680,610 B2
(45) Date of Patent: Mar. 16, 2010

(54) TIRE ABRASION PREDICTING METHOD, TIRE DESIGNING METHOD, TIRE MANUFACTURING METHOD, TIRE ABRASION PREDICTING SYSTEM, AND PROGRAM

(75) Inventors: Naoshi Miyashita, Kanagawa (JP); Kazuyuki Kabe, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 238 days.

(21) Appl. No.: 11/722,441

(22) PCT Filed: Feb. 21, 2006

(86) PCT No.: PCT/JP2006/303027

§ 371 (c)(1),
(2), (4) Date: Jun. 21, 2007

(87) PCT Pub. No.: WO2006/090686

PCT Pub. Date: Aug. 31, 2006

(65) Prior Publication Data

US 2008/0228411 A1    Sep. 18, 2008

(30) Foreign Application Priority Data

Feb. 23, 2005   (JP) .............................. 2005-047068

(51) Int. Cl.
*G01B 3/44* (2006.01)
*G06F 7/00* (2006.01)
*B60C 23/00* (2006.01)

(52) U.S. Cl. ........................... 702/34; 701/71; 73/146.2

(58) Field of Classification Search .................. 702/34, 702/43, 82; 73/146; 701/71, 81, 83
See application file for complete search history.

(56) References Cited

U.S. PATENT DOCUMENTS

| | | | |
|---|---|---|---|
| 6,634,218 B1 * | 10/2003 | Nakanishi et al. | ......... 73/116.05 |
| 2005/0065666 A1 * | 3/2005 | Miyashita et al. | .............. 701/1 |
| 2006/0069523 A1 * | 3/2006 | Kanekawa et al. | ............ 702/84 |
| 2007/0205879 A1 * | 9/2007 | Matsuda et al. | ............. 340/438 |

FOREIGN PATENT DOCUMENTS

| | | |
|---|---|---|
| JP | 11-321257 A | 11/1999 |
| JP | 2001-1723 A | 1/2001 |
| JP | 2004-142571 A | 5/2004 |
| JP | 2005-88832 A | 4/2005 |

OTHER PUBLICATIONS

International Search Report for PCT/JP2006/303027 dated May 18, 2006.

* cited by examiner

*Primary Examiner*—Bryan Bui
(74) *Attorney, Agent, or Firm*—Knobbe Martens Olson & Bear, LLP

(57) ABSTRACT

In a prediction of abrasion characteristic of a tire, a characteristic curve of a tire axis force generated on a tire rotation axis at the slip ratio applied to the tire and changed depending upon the slip ratio is acquired. From the characteristic curve, values of tire dynamic element parameters determining the characteristic curve are derived based on a tire dynamic model constituted by the tire dynamic element parameters. Furthermore, a tire sliding amount based on a sliding region, the sliding region and an adhesive region formed on the contact patch of the tire at the applied slip ratio are calculated by applying the values of the tire dynamic element parameters to the model. Lastly, an abrasion characteristic of a tread part of the tire at the applied slip ratio is predicted by using the tire sliding amount with abrasion characteristic data of a tread rubber of the tread part. According to the prediction results, a tire is designed and produced.

18 Claims, 19 Drawing Sheets

$$p(t) = \frac{n+1}{n} \cdot \frac{F_z}{wl} \cdot D_{gsp}(t;n,q)$$

NOTE THAT $D_{gsp}(t;n,q) = (1-|2t-1|^n) \cdot \{1-q \cdot (2t-1)\}$     (9)

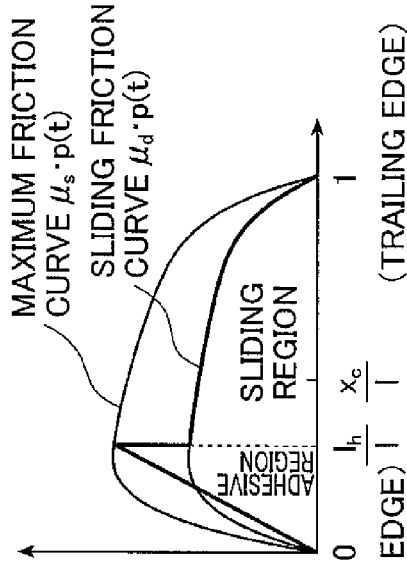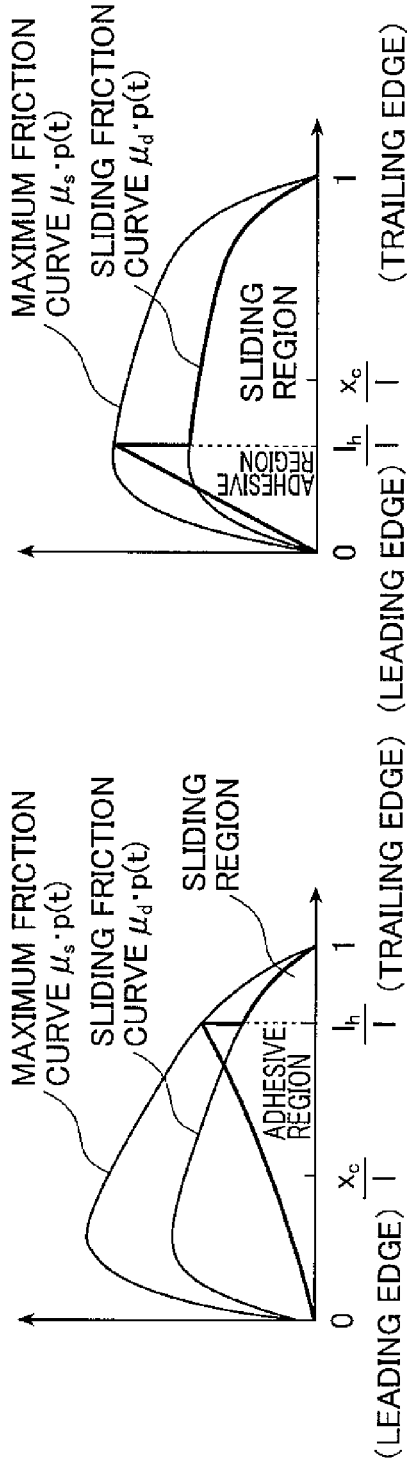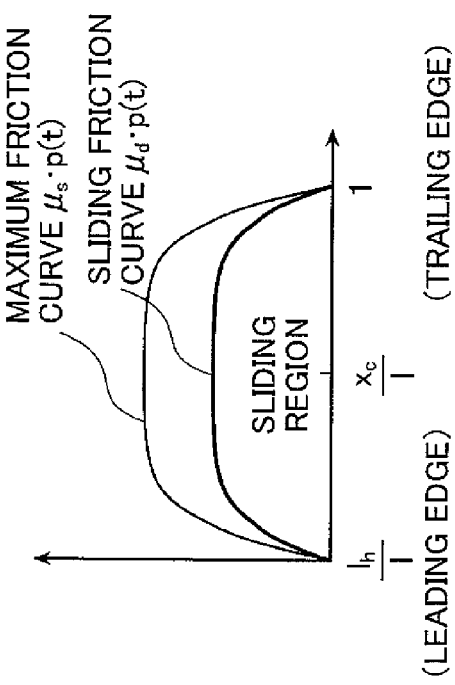

FIG. 15

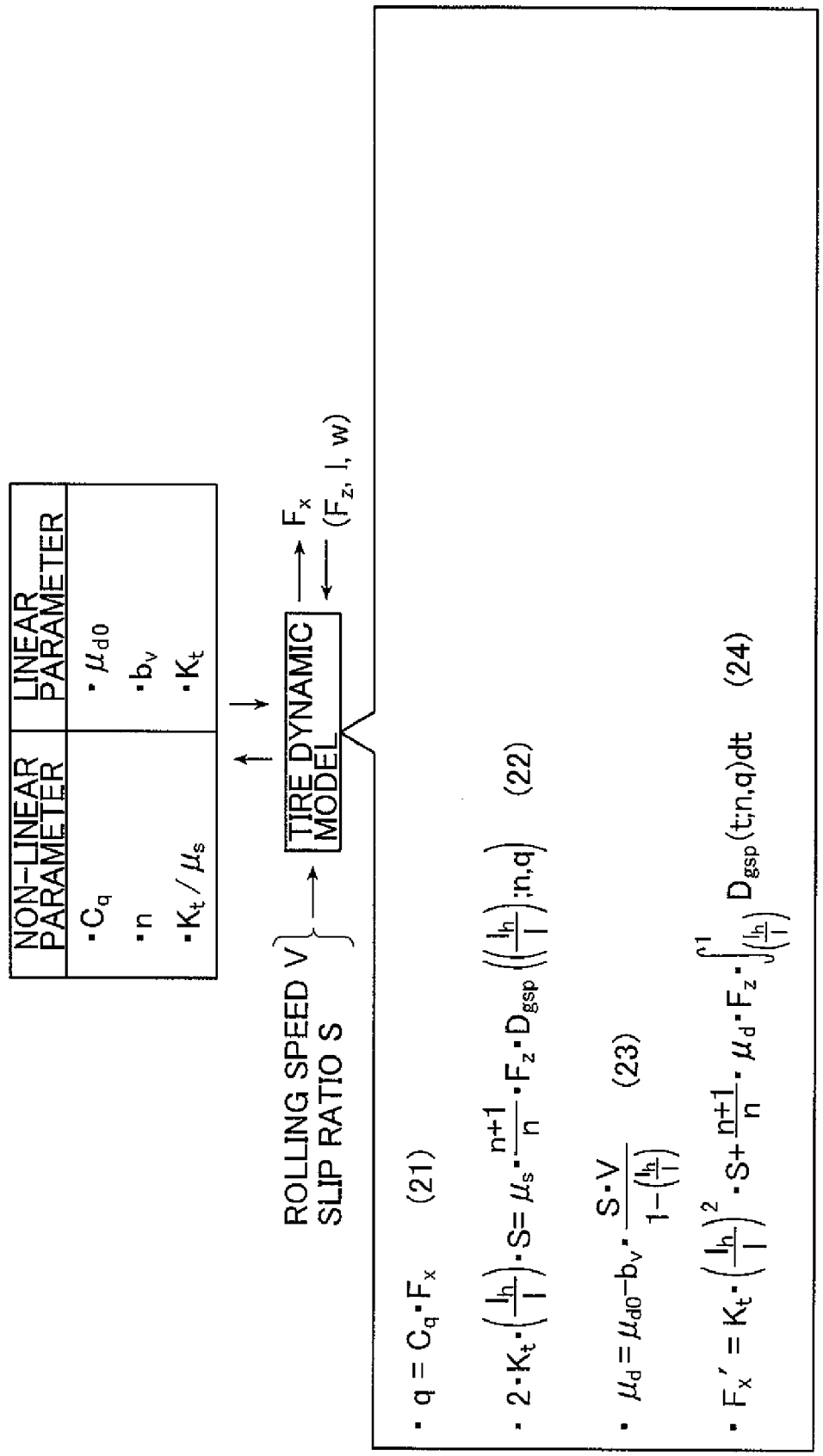

| NON-LINEAR PARAMETER | LINEAR PARAMETER |
|---|---|
| $\cdot C_q$ | $\cdot \mu_{d0}$ |
| $\cdot n$ | $\cdot b_v$ |
| $\cdot K_t / \mu_s$ | $\cdot K_t$ |

ROLLING SPEED V  
SLIP RATIO S $\longrightarrow$ TIRE DYNAMIC MODEL $\longrightarrow F_x$ $(F_z, l, w)$

- $q = C_q \cdot F_x$ \qquad (21)

- $2 \cdot K_t \cdot \left(\frac{l_h}{l}\right) \cdot S = \mu_s \cdot \frac{n+1}{n} \cdot F_z \cdot D_{gsp}\left(\left(\frac{l_h}{l}\right); n, q\right)$ \qquad (22)

- $\mu_d = \mu_{d0} - b_v \cdot \dfrac{S \cdot V}{1 - \left(\frac{l_h}{l}\right)}$ \qquad (23)

- $F_x' = K_t \cdot \left(\dfrac{l_h}{l}\right)^2 \cdot S + \dfrac{n+1}{n} \cdot \mu_d \cdot F_z \cdot \displaystyle\int_{\left(\frac{l_h}{l}\right)}^{1} D_{gsp}(t; n, q) \, dt$ \qquad (24)

_US 7,680,610 B2_

TIRE ABRASION PREDICTING METHOD, TIRE DESIGNING METHOD, TIRE MANUFACTURING METHOD, TIRE ABRASION PREDICTING SYSTEM, AND PROGRAM

CROSS REFERENCE TO RELATED APPLICATIONS

This application claims to benefit and priority to and is a U.S. National Phase of PCT International Application Number PCT/JP2006/303027, filed on Feb. 21, 2006, designating the United States of America, which claims priority under U.S.C. §119 to Japanese Application 2005-047068 filed on Feb. 23, 2005. The disclosures of the above-referenced applications are hereby incorporated by this reference in their entirety.

TECHNICAL FIELD

The present invention relates to a tire abrasion predicting method for predicting an abrasion characteristic of a tire at a slip ratio applied to the tire which rolls on a road surface so as to form a sliding region on a contact patch, relates to a tire designing method for designing a tire by using this tire abrasion predicting method, relates to a tire manufacturing method for manufacturing a tire designed by the tire designing method, relates to a tire abrasion predicting system for performing the above-mentioned tire abrasion predicting method, and further, relates to a program for executing this tire abrasion predicting system.

BACKGROUND ART

Tires mounted on vehicles are rolled in contact to road surfaces, so that these tires are expendable supplies in which tread parts are worn away while the tires are traveling. Accordingly, such tires are desired which own superior abrasion characteristics within a range in which the tread parts of those tires do not sacrifice other performance (e.g., steering performance, and vibration riding comfort performance).

Generally speaking, an abrasion characteristic of a tread part of a tire, for instance, an abrasion amount of the tread part is determined by a sliding amount of the tread part which partially slides with respect to a road surface and an abrasion resistance material of a rubber contained in the tread part.

In general, it is known that abrasion ratios of a tread part under operating conditions are arranged in the following order from the largest abrasion ratio: the abrasion ratio during a cornering operation, the abrasion ratio during a breaking operation, and the abrasion ratio during a driving operation.

On the other hand, during a cornering operation in which an abrasion ratio is large, a sliding amount of the tread part with respect to a road surface is not exclusively determined based on a slip angle. That is, this sliding amount is determined not only based on an adhesive friction coefficient and a sliding friction coefficient of the tread part, but also a structure of a belt part and a structure of a side part.

Also, during a breaking operation in which an abrasion ratio is relatively large, a sliding amount of the tread part with respect to a road surface is not exclusively determined based on a slip ratio during the braking operation. That is, this sliding amount is determined not only based on an adhesive friction coefficient and a sliding friction coefficient of the tread part, but also a structure of a belt part and a structure of a side part.

Meanwhile, in a case where an abrasion characteristic of a tire is predicted, the prediction is evaluated based on a material breaking characteristic of rubber used in a tread part, and a result of an indoor-laboratory test (i.e., abrasion amount measuring test) of the rubber. As the indoor-laboratory test, for instance, various sorts of testing methods described in the newly published JIS (Japanese Industrial Standard) K6264 are used.

However, as previously described, an abrasion characteristic of a tread part in a tire is not influenced only by a rubber material of the tread material. The abrasion characteristic is influenced by not only the adhesive friction coefficient and the sliding friction coefficient of the tread part, but also the structure of the belt part and the structure of the side part. Thus, the abrasion characteristic of the tire is not predicted with high precision only by the evaluation of the rubber material. In a case where an abrasion test is carried out using an actual vehicle, the abrasion characteristic is predicted with high precision. However, there is a problem that lengthy testing time is necessarily required.

DISCLOSURE OF THE INVENTION

Problem to be solved by the Invention

Accordingly, the present invention has an object to provide a tire abrasion predicting method, a tire designing method performed by using this tire abrasion predicting method, a tire manufacturing method performed by using this tire designing method, a tire abrasion predicting system for predicting an abrasion characteristic of a tire, and a program capable of executing this tire abrasion predicting system. In the tire abrasion predicting method, in a case where an abrasion characteristic of a tire is predicted at a slip ratio applied to the tire to form a sliding region on a contact patch, an abrasion characteristic of the tire is predicted not only by an evaluation of a rubber material of a tread part, but also a sliding amount of the tread part with respect to a road surface.

Means to Solve the Problem

According to the present invention, there is provided a tire abrasion predicting method for predicting an abrasion characteristic of a tire by calculating a tire sliding amount at a slip ratio applied to the tire rolling on a road surface so as to form a sliding region on a contact patch, the method including the steps of: acquiring a characteristic curve of a tire axis force exerted on a tire rotation axis at the slip ratio applied to the tire, the tire axis force being changed depending upon the slip ratio; deriving values of tire dynamic element parameters for determining the characteristic curve from the characteristic curve based on a tire dynamic model constituted by the tire dynamic element parameters; calculating a tire sliding amount based on a sliding region, the sliding region and an adhesive region, which are formed on the contact patch of the tire at the applied slip ratio, being calculated by applying the values of the tire dynamic element parameters to the tire dynamic model; and predicting an abrasion characteristic of a tread part of the tire at the applied slip ratio by using the tire sliding amount in combination with abrasion characteristic data of a tread rubber of the tread part.

In this case, the slip ratio may preferably include at least one of a slip ratio which is caused by applying a slip angle to the tire, and a slip ratio in the braking/driving direction.

The tire axis force is a lateral force which is exerted in a direction parallel to the tire rotation axis when the slip angle is applied to the tire. In this case, in the step of acquiring the characteristic curve, it is preferable to acquire a characteristic curve indicative of a slip angle dependency of self-aligning torque which is generated by the lateral force, in addition to the characteristic curve of the lateral force.

In this case, it is preferable that the tire dynamic model is a model in which a lateral force at a slip angle applied to the tire is calculated and the self-aligning torque is divided into a lateral force-based torque component and a longitudinal force-based torque component, which are respectively calculated. The lateral force-based torque component is generated by a lateral force executed on the contact patch of the tire and the longitudinal force-based torque component is generated by a longitudinal force exerted on the contact patch of the tire.

Further, when the values of the tire dynamic element parameters are derived, it is preferable to derive this values of the tire dynamic element parameters in such a manner that a value of a combined sum of squared residuals becomes equal to or smaller than a predetermined value. This combined sum of squared residuals is obtained by weighted summation of two sums of squared residuals by using weighting coefficients, one sum of the two sums of squared residuals being calculated between the characteristic curve of the lateral force and a curve corresponding to the lateral force calculated in the tire dynamic model and another sum of the two sums of squared residuals being calculated between the characteristic curve of the self-aligning torque and a curve corresponding to the self-aligning torque calculated in the tire dynamic model. As the weighting coefficients, such coefficients are used which are obtained from variation information as to values, which are changed depending upon the slip angle, of the respective characteristic curves of the lateral force and the self-aligning torque.

Also, while the slip angle and the slip ratio in the braking/driving direction are applied to the tire, the tire axis force corresponds to the lateral force exerted in the direction parallel to the tire rotation axis and the longitudinal force exerted in the direction perpendicular to the tire rotation axis. In the step of acquiring the characteristic curve, in addition to the characteristic curve of a slip angle dependency of the lateral force, it is preferable to acquire a characteristic curve indicative of a slip angle dependency of the self-aligning torque generated by the lateral force and a characteristic curve indicative of a slip ratio dependency of the longitudinal force.

In this case, the tire abrasion predicting method preferably further includes a step of calculating a tire sliding amount at a predetermined slip angle and a predetermined slip ratio in the braking/driving direction based on the tire dynamic model by using the derived values of the tire dynamic element parameters, and predicting a tread abrasion characteristic of the tire at the predetermined slip angle and the predetermined slip ratio in the braking/driving direction by using the calculated tire sliding amount. Also, when the values of the tire dynamic element parameters are derived, it is preferable to derive the values of the tire dynamic element parameters in such a manner that a value of a combined sum of squared residuals becomes equal to or smaller than a predetermined value. The combined sum of squared residuals is obtained by weighted summation of three sums of squared residuals by using a weight coefficient, the three sums of squared residuals being calculated between the characteristic curve of the longitudinal force and a curve corresponding to the longitudinal force calculated in the tire dynamic model, being calculated between the characteristic curve of the lateral force and a curve corresponding to the lateral force calculated in the tire dynamic model, and being calculated between the characteristic curve of the self-aligning torque and a curve corresponding to the self-aligning torque calculated in the tire dynamic model, respectively. As the weighting coefficient, such coefficients are used which are obtained from variation information as to values, which are changed depending upon the slip angle, of the respective characteristic curves of the lateral force and the self-aligning torque.

Further, in the case where the values of the tire dynamic element parameters are derived from the characteristic curve based on the tire dynamic model, it is preferable to derive the values of the tire dynamic element parameters by using an effective slip angle obtained by correcting a slip angle to be applied based on a torsional deformation of the tire generated by the self-aligning torque.

The derived values of the tire dynamic element parameters preferably contain an adhesive friction coefficient and a sliding friction coefficient between the tread part of the tire and the road surface, and a shape defining coefficient of defining a shape of a contact pressure distribution. The adhesive friction coefficient, the sliding friction coefficient, and the shape defining coefficient are preferably derived by using at least one of a stiffness parameter with respect to a shear deformation of the tire, a stiffness parameter with respect to a lateral bending deformation of the tire, and a stiffness parameter with respect to a torsional deformation of the tire, which have been previously acquired.

Also, when the slip ratio in the braking/driving direction is applied to the tire, the above-mentioned tire axis force corresponds to the longitudinal force exerted in the direction perpendicular to the tire rotation axis. In the step of acquiring the characteristic curve, a characteristic curve indicative of a slip ratio dependency of the longitudinal force may be preferably acquired.

Further, the present invention provides a tire designing method including: a step of predicting an abrasion characteristic of a tread part by using the above-mentioned tire abrasion predicting method; a step of correcting a values of a tire dynamic element parameters in a case where a predicted result as to the abrasion characteristic of the tread part does not reach a target; and a step of determining the set values of the tire dynamic element parameters as a tire designing specification characteristic in a case where the predicted result of the abrasion characteristic of the tread part reaches the target.

In this case, it is preferable that the tire dynamic element parameters to be corrected include a stiffness parameter indicative of a stiffness in the tire dynamic model, and the tire designing method further include a step of designing a structural part of a tire based on the values of the tire dynamic element parameters which are determined as the tire designing specification characteristic. Also, it is preferable that the tire dynamic element parameters to be corrected include an adhesive friction coefficient or a sliding friction coefficient in the tire dynamic model, and the tire designing method further include a step of designing a rubber material part of a tire based on the values of the tire dynamic element parameters which are determined as the tire designing specification characteristic.

Further, the present invention provides a tire manufacturing method that a tire is manufactured by using a structural part of the tire or a rubber part of the tire, which is determined by the above-mentioned tire designing method.

Moreover, the present invention provides a tire abrasion predicting system for predicting an abrasion characteristic of a tire by calculating a tire sliding amount at a slip ratio applied to the tire rolled on a road surface to form a sliding region on a contact patch, which includes: means for acquiring a characteristic curve of a tire axis force exerted on a tire rotation axis at the slip ratio applied to the tire, the tire axis force being changed depending upon the slip ratio; means for deriving values of tire dynamic element parameters for determining the characteristic curve from the characteristic curve of the tire axis force based on the tire dynamic model, the tire dynamic model constituted by the tire dynamic element parameters; means for acquiring an adhesive region and a sliding region by applying the values of the tire dynamic element parameters to the tire dynamic model, the region formed on the contact patch of the tire at the applied slip ratio, and calculating a tire sliding amount from the sliding region; and means for predicting an abrasion characteristic of the tread part of the tire at the applied slip ratio by using the tire sliding amount in combination with abrasion characteristic data of a tread rubber part.

In addition, the present invention provides a computer executable program for predicting an abrasion characteristic of a tire by calculating a tire sliding amount at a slip ratio applied to the tire rolled on a road surface to form a sliding region on a contact patch, which includes the procedures of: causing a computer to acquire a characteristic curve of a tire axis force exerted on a tire rotation axis at the slip ratio applied to the tire, the tire axis force being changed depending upon the slip ratio, and causing a memory of the computer to store the acquired characteristic curve; a procedure for causing a calculation means of the computer to derive values of tire dynamic element parameters for determining the characteristic curve from the characteristic curve of the tire axis force stored in the memory based on a tire dynamic model constituted by the tire dynamic element parameters; causing the calculation means to operate in such a manner that the derived values of the tire dynamic element parameters are applied to the tire dynamic model to calculate both an adhesive region and a sliding region, which are formed on the contact patch of the tire at the applied slip ratio, and causing the calculation means to calculate a tire sliding amount from the sliding region; and causing the calculation means to predict an abrasion characteristic of a tread part of the tire at the applied slip ratio by using the tire sliding amount in combination with abrasion characteristic data of a tread rubber of the tread part.

EFFECTS OF THE INVENTION

In the present invention, the sliding amount of the tire at the slip ratio applied to the tire so as to form the sliding region on the contact patch is calculated based on the tire dynamic model which is constituted by the plurality of tire dynamic element parameters. Since the values of the tire dynamic element parameters to be derived reproduce the characteristic curve with high precision, the tire sliding amount can also be predicted with high precision. As a consequence, the tire abrasion characteristic can be evaluated and predicted with high precision by using the predicted sliding amount of the tire.

BRIEF DESCRIPTION OF THE DRAWINGS

FIG. 4 FIGS. 4A to 4C shows other explanatory diagrams explaining tire dynamic models used in the tire abrasion predicting method of the present invention.

FIG. 5 FIGS. 5A to 5D show other explanatory diagrams explaining tire dynamic models used in the tire abrasion predicting method of the present invention.

FIG. 6 FIGS. 6A to 6C show other explanatory diagrams explaining tire dynamic models used in the tire abrasion predicting method of the present invention.

FIG. 15 An explanatory diagram explaining a tire dynamic model used as another embodiment used in the tire abrasion predicting method of the present invention.

FIG. 16 FIG. 16A shows a block diagram explaining a process of calculating a longitudinal force in the tire dynamic model shown in FIG. 15.

FIG. 17 FIG. 17A shows a diagram explaining an example of a characteristic curve used in the tire abrasion predicting method of the present invention.

FIG. 18 FIG. 18A shows a diagram explaining another example of a characteristic curve used in the tire abrasion predicting method of the present invention.

FIG. 20 FIGS. 20A to 20D show diagrams explaining an example of tire abrasion characteristics acquired by the tire abrasion predicting method of the present invention.

Figure 1:
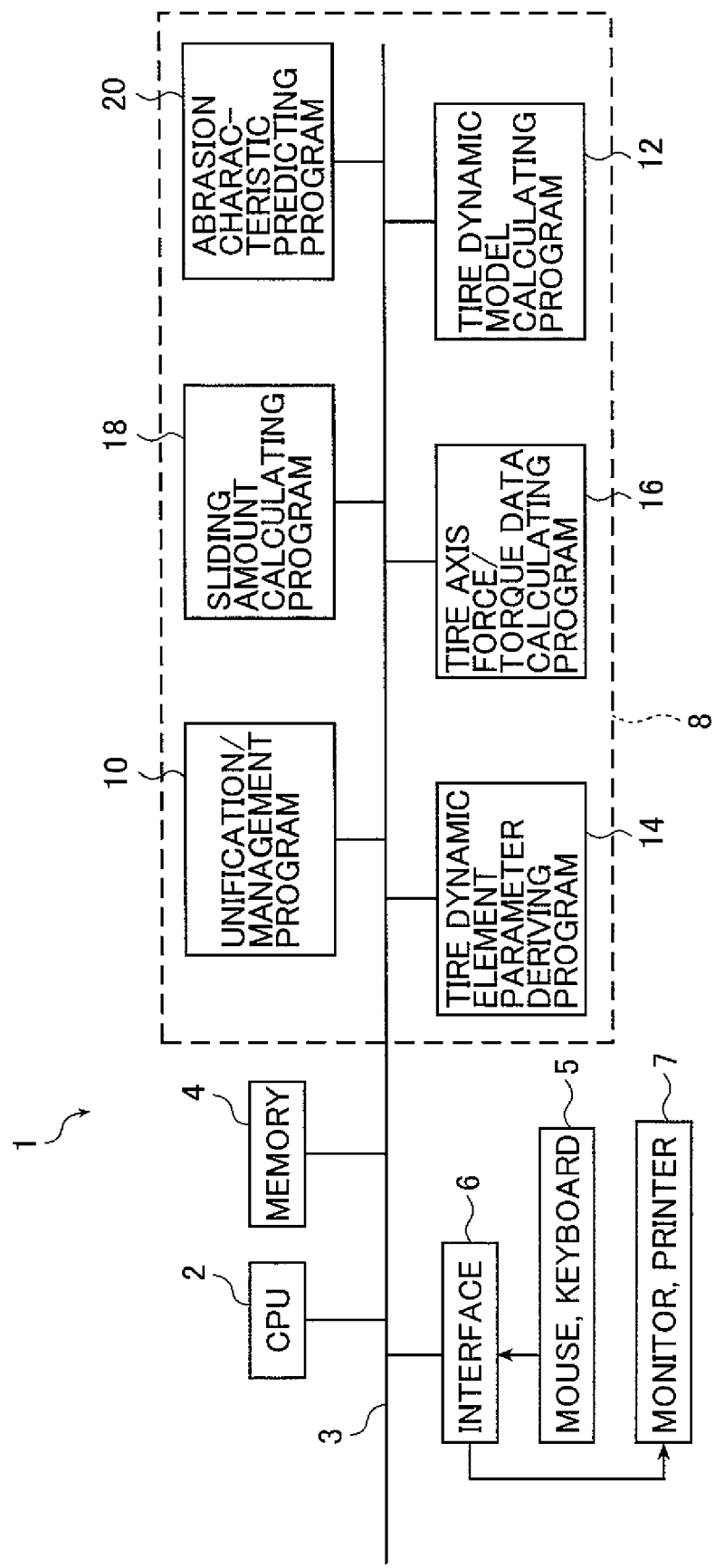
FIG. 1 A block diagram showing an apparatus as an example of a tire abrasion predicting system of the present invention, which performs a tire abrasion predicting method of the present invention.

LEGEND 1 apparatus
2 CPU
3 bus
4 memory
5 input operation system
6 interface 7 output apparatus
8 program group
10 unification/management program
12 tire dynamic model calculation program
14 tire dynamic element parameter deriving program
16 tire axis force/torque calculating program
18 sliding amount calculating program
20 friction characteristic prediction program

BEST MODE FOR CARRYING OUT THE INVENTION

Referring now to the accompanying drawings, a tire abrasion predicting method, a tire designing method, a tire manufacturing method, a tire abrasion predicting system, and a program, according to the present invention, will be described in detail.

In the below-mentioned embodiment as to the tire abrasion predicting method of the present invention, first of all, characteristic curves indicative of a slip angle dependency of a tire axis force, and other characteristic curves indicative of a slip angle dependency of self-aligning torque are acquired under various slip ratios. The tire axis force generated at a tire rotation axis when a slip angle is given to a tire. The self-aligning torque generated at the tire rotation axis. Based on a tire dynamic model constructed by using a plurality of tire dynamic element parameters, values of the tire dynamic element parameters which determine the above-mentioned characteristic curves are derived from these characteristic curves. Next, this derived values of the tire dynamic element parameters are given to the tire dynamic model to acquire an adhesive region and a sliding region, which are formed on a contact patch of a tire, and then, a tire sliding amount is calculated from this sliding region. Based on the sliding amount, an abrasion characteristic of the tire is predicted. In other words, since a slip angle and a slip ratio in the braking/driving direction are freely given to the tire, a sliding amount of a tread part of the tire at this time is calculated. Then, an abrasion characteristic of the tire is predicted by using the calculated sliding amount and information as to a rubber material.

It should be understood that assuming now that a slip angle is defined as α, since tan α is equal to a slip ratio, a "slip ratio" defined in the present invention contains tan α, where the slip angle assumed as α, in addition to the slip ratio in the braking/driving direction.

In the below-mentioned description, the slip angle and the slip ratio in the braking/driving direction will be explained in a discriminate manner.

A tire dynamic model for calculating such the tire sliding amount will be described in detailed in the below-mentioned description.

FIG. 1 is a schematic block diagram for showing an arrangement of an apparatus 1 which performs an abrasion predicting method of a tire, according to the present invention. The apparatus 1 is arranged by a computer which performs a vehicle designing method by executing various sorts of programs.

The apparatus 1 derives values of a plurality of tire dynamic element parameters (hereinafter, referred to simply as "parameters") based on a tire dynamic model described below in response to an input of tire axis force/torque data such as a longitudinal force $F_x$, a lateral force $F_y$ and a self-aligning torque (hereinafter, referred to simply as "torque") $M_z$. Alternatively, the apparatus 1 calculates tire axis force/torque data such as the longitudinal force, the lateral force, and the torque by using the tire dynamic model in response to an input of a tire dynamic element parameter value in the tire dynamic model.

The apparatus 1 is arranged by containing a CPU 2, a memory 4, an input operation system 5 such as a mouse and a keyboard, an interface 6, an output apparatus 7, and a program group 8. The CPU 2 manages and controls various units of the computer and executions of respective programs. The memory 4 stores thereinto various sorts of conditions and calculation results via a bus 3. The input operation system 5 instructs to input various sorts of conditions and various sorts of information. The interface 6 connects the input operation system 5 to the bus 3. The output apparatus 7 displays thereon input screens of the various sorts of conditions and information or processed results of various sorts of programs, and outputs printed results. The program group 8 contains various sorts of programs to be explained later, and enables the functions of the apparatus 1.

In this case, the program group 8 contains a unification/management program 10, a tire dynamic model calculating program 12, a tire dynamic element parameter deriving program 14, a tire axis force/torque data calculating program 16, a sliding amount calculating program 18, and an abrasion characteristic predicting program 20.

The tire dynamic model calculating program 12 corresponds to a program for calculating tire axis force/torque such as a longitudinal force, a lateral force, and a torque in such a manner that a tire dynamic model is expressed by an analysis formula, by using a tire dynamic element parameter.

The tire dynamic model calculating program 14 corresponds to a calculating unit for returning corresponding calculated data as to a longitudinal force, a lateral force, and a torque (i.e., longitudinal force $F_x'$, lateral force $F_y'$, and torque $M_z'$) as a processed result to both the tire dynamic element parameter deriving program 14 and the tire axis force/torque data calculating program 16 by using a given value of a tire dynamic element parameter under a condition of both a predetermined slip angle and a slip ratio in a braking/driving direction.

FIG. 2, FIG. 3, FIGS. 4A to 4C, FIGS. 5A to 5D, and FIGS. 6A to 6C are diagrams for explaining a tire dynamic model.

Figure 2:
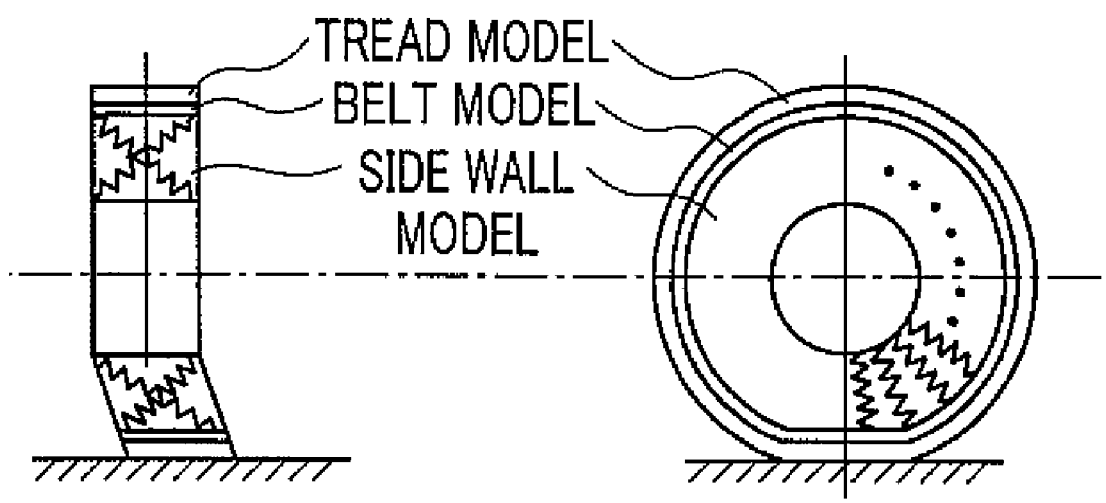
FIG. 2 An explanatory diagram explaining a tire dynamic model used in the tire abrasion predicting method of the present invention.

As shown in FIG. 2, the tire dynamic model is arranged by including a side wall model, a belt model, and a tread model on a rigid cylindrical member. The side wall model is constituted of a plurality of spring elements which have a spring characteristic of a side wall. The belt model is made of an elastic ring body connected to these plurality of spring elements. The tread model is made of an elastic element which represents the tread model connected to a surface of this elastic ring body.

As the dynamic element parameters derived based on the tire dynamic model, the following parameters are given by way of examples:

(a) a longitudinal stiffness/lateral stiffness $K_t$ defined by shear stiffnesses along a lateral direction and a longitudinal direction of a tire;
(b) a sliding friction coefficient $\mu_{d0}$ between a road surface and the tire at a sliding speed of 0;
(c) an adhesive friction coefficient $\mu_s$ between the road surface and the tire;
(d) a lateral bending coefficient $\epsilon$ of a belt part;
(e) a torsional compliance $(1/G_{mz})$ corresponding to an inverse number of a torsional stiffness around a tire center axis of the tire;
(f) a coefficient n for defining a contact pressure distribution on a contact patch when the lateral force is generated;

(g) a coefficient $C_q$ for indicating the degree of a bias in the contact pressure distribution;

(h) a shift coefficient $C_{xc}$ for indicating the degree of a longitudinal shift at the center position of the tire on the contact patch;

(i) an effective contact length $l_e$ at the lateral force generation; and (j) A rolling speed dependency coefficient $b_v$ of the sliding friction coefficient µd.

In this case, the longitudinal stiffness/lateral stiffness $K_l$, the lateral bending coefficient ε, and $G_{mz}$ of the torsional compliance ($1/G_{mz}$) are a stiffness parameter against shear deformation of a tire, a stiffness parameter against lateral bending deformation, and a stiffness parameter against torsional deformation of the tire, respectively. A lateral direction in which the lateral force is generated designates an axial direction of a rotational axis of the tire. Therefore, in the case where the tire rotates to travel straight ahead, the lateral direction becomes identical with the right-left direction with respect to the travelling direction. On the other hand, in the case where the tire rotates at a slip angle, the lateral direction shifts with respect to the travelling direction of the tire by the slip angle. The longitudinal direction designates a direction which is parallel to a road surface at which the tire comes into contact and which perpendicularly crosses the axial direction of the rotational axis of the tire. A tire central axis (axes CL in FIGS. 5A and 5B) is vertical to the road surface, perpendicularly crosses the rotational axis by which the tire rotates, and passes on a central plane of the tire in a width direction.

Figure 3:
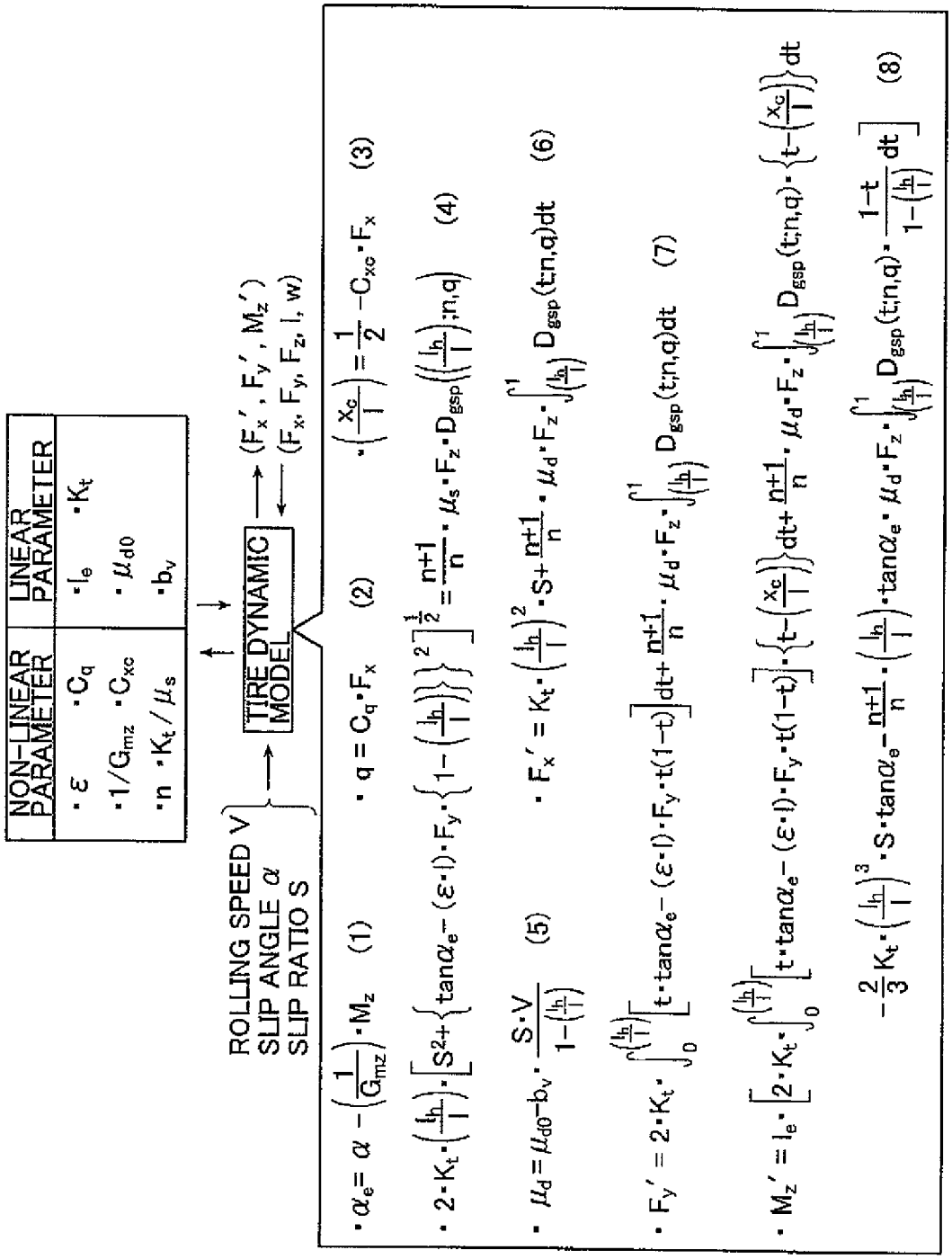
FIG. 3 Another explanatory diagram explaining a tire dynamic model used in the tire abrasion predicting method of the present invention.

As shown in FIG. 3, while a dynamic element parameter, which is made of both a linear parameter and a non-linear parameter such as the lateral bending coefficient ε of the belt part and the coefficient $C_q$, is set, since the slip angle α, the slip ratio S in the braking/driving direction, the rolling speed V, the longitudinal force $F_x$, the lateral force $F_y$, and the torque $M_z$ are inputted, a longitudinal force, a lateral force, and a value of a torque (referred to as "longitudinal force $F_x$'", "lateral force $F_y$'", and "torque $M_z$'" hereinafter), which have been processed in accordance with the formulae (1) to (8) shown in FIG. 3 are calculated. It is apparent that, only when an error between the values of the input longitudinal force $F_x$, lateral force $F_y$, and torque $M_z$ and the processed values of the longitudinal force $F_x$', lateral force $F_y$', and torque $M_z$' is a predetermined value or less, that is, when the values are approximately identical with each other (i.e., converged and in mechanical equilibrium in the tire dynamic model), the values of the longitudinal force $F_x$', the lateral force $F_y$', and the torque $M_z$' are determined as values of the lateral force and the torque of the tire, which realize the mechanical equilibrium.

The linear parameters designate dynamic element parameters represented in the formulae (6) to (8) in a linear form, whereas the non-linear parameters designate dynamic element parameters represented in the formulae (6) to (8) in a non-linear form.

Figures 4A, 4B:
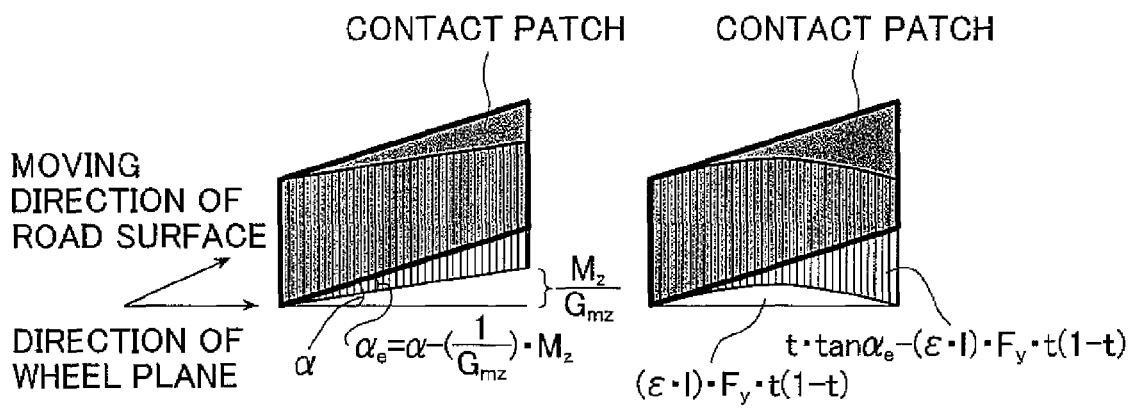

As represented in the formula (1), the tire dynamic element calculating program 12 calculates a twisting shift angle obtained by the input torque $M_z$ and the input torsional compliance ($1/G_{mz}$). Then, the obtained twisting shift angle is subtracted from the given slip angle α so that an effective slip angle $α_e$ is calculated. The reason why the effective slip angle $α_e$ is calculated in this way is because the torque acts on the tire itself to reduce the given slip angle to twist the tire back, in the case where the torque $M_z$ is larger than 0. As a consequence, as shown in FIG. 4A, if the torque $M_z$ is larger than 0, the effective slip angle $α_e$ is smaller than the actually given slip angle α.

Figure 5A:
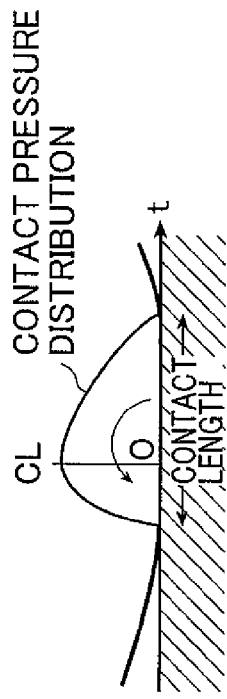
Figure 5B:
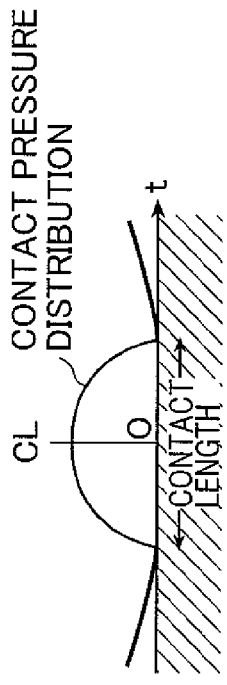

In addition, in accordance with the formula (2), a bias coefficient q for defining the profile of distribution of a contact pressure is calculated from the longitudinal force $F_x$. The bias coefficient q is a parameter for indicating a profile of distribution of a contact pressure biased and changed from the distribution of a contact pressure of the tire in a straight traveling state at the slip angle α=0 (see FIG. 5A) due to the generation of the lateral force $F_y$ in a forward traveling direction (i.e., toward a leading edge on the contact patch) as shown in FIG. 5B. Assuming that the distribution of a contact pressure is p(t) (t is a position on the coordinates obtained through normalization in a contact length when a t-axis is defined in a backward traveling direction in FIGS. 5A and 5B), the profile of the distribution of the contact pressure p(t) is defined by a function $D_{gsp}$ (t;n, q) expressed by the formula (9) in FIG. 5B.

Figure 5C:
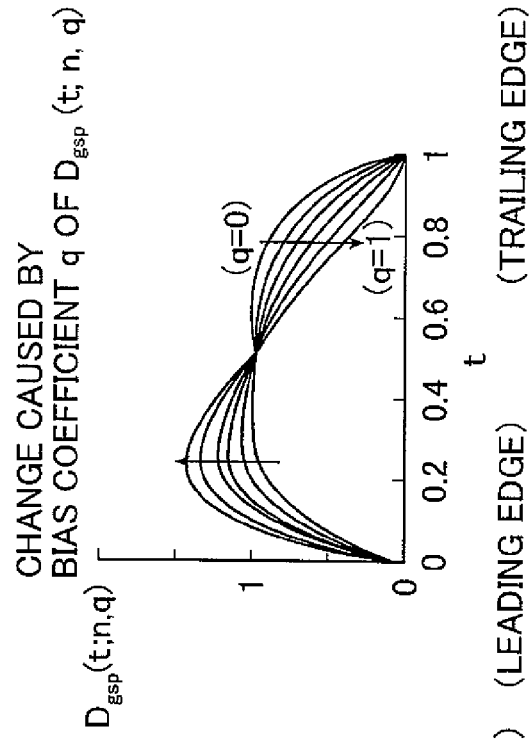
Figure 5D:
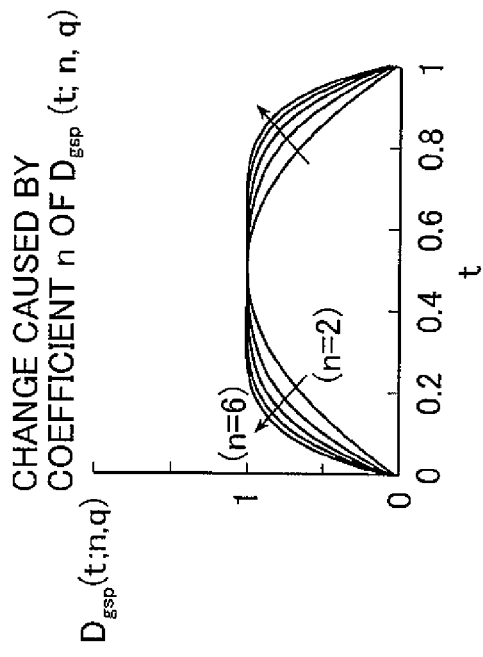

Here, a coefficient n in the function $D_{gsp}$ (t;n, q) defines the distribution of the contact pressure on the contact patch while the lateral force is being generated, and defines the distribution of the contact pressure so that the distribution becomes more angular (i.e., a curvature becomes larger) in the vicinity of the leading edge and a trailing edge of the distribution of the contact pressure as shown in FIG. 5C. Moreover, as shown in FIG. 5D, as the coefficient q increases from 0 to 1, the position of a peak of the distribution of the contact pressure is set so as to shift toward the leading edge side. As described above, the coefficients q and n are profile defining coefficients for defining the distribution profile of the contact pressure.

Further, in accordance with the formula (3), a value ($X_c/l$) for indicating the degree of a shift of the center position of the tire toward the leading edge side when the lateral force $F_y$ is generated is calculated in association with the torque $M_z$. In this case, l is a contact length. The reason why a shift of the center position O of the tire is defined in the formula (3) is because the center position O serving as the center of rotation of the torque $M_z$ shifts toward the leading edge side on the contact patch due to the generation of the lateral force $F_y$ as shown in FIG. 5B.

Further, in accordance with the formula (4), a boundary position ($1_h/1$) between a sliding friction and an adhesive friction in the contact patch which occur when the slip angle α is large, is calculated. The boundary position ($1_h/1$) is defined in the following manner.

The maximum friction curves shown in FIGS. 6A to 6C are obtained by multiplying the adhesive friction coefficient $µ_s$ by the contact pressure distribution p(t). The tire tread part which is brought into contact with the road surface on the leading edge is gradually sheared along the lateral direction by the road surface due to the slip angle α as the tire tread part moves toward the trailing edge, so a lateral shear force (i.e., adhesive frictional force) is generated in the tire tread part. In addition, the tire tread part is gradually sheared along the longitudinal direction by the road surface due to the slip ratio S in the braking/driving direction, which is produced by a difference between the moving speed on the road surface and the rolling speed of the tire, so a longitudinal shear force (i.e., adhesive frictional force) is generated in the tire tread part. The shear force generated between the tire and the road surface is expressed by combining the lateral shear force with the longitudinal shear force.

If the combined shear force gradually increases to reach the maximum friction curve, the tire tread part which has been adhered to the road surface starts sliding to generate a sliding frictional force in accordance with a sliding frictional curve obtained by multiplying the sliding friction coefficient $µ_d$ by the contact pressure distribution p(t). In FIG. 6A, the region on the leading edge side from the boundary position ($1_h/1$) is an adhesive region in which the tire tread part is adhered to the road surface, whereas the region on the trailing edge side is a sliding region in which the tire tread part slides on the road surface. The boundary position ($l_h/l$) is defined by the formula (4).

FIG. 6B shows a state where the slip angle α is larger than that shown in FIG. 6A. The boundary position ($l_h/l$) moves toward the leading edge side as compared with FIG. 6A. If the slip angle α further increases, a sliding friction is generated at the position of the leading edge on the contact patch as shown in FIG. 6C.

As can be seen from FIGS. 6A to 6C, a ratio of the adhesive region and the sliding region greatly varies depending on the slip angle α. A lateral frictional force in the adhesive region and the sliding region as described above, that is, a lateral force component, is integrated along a tire width direction, whereby the lateral force $F_y'$ can be calculated. Further, by calculating a moment around the tire center O, the torque $M_z'$ can be calculated.

Similarly, as to a longitudinal shear force, a longitudinal frictional force in both the adhesive region and the sliding region, namely, a longitudinal force component is integrated along the tire width direction so that the longitudinal force $F_x'$ can be calculated.

In the formulae (6) to (8), the longitudinal force $F_x'$, the lateral force $F_y'$, and the torque $M_z$ are calculated separately for the adhesive region and the sliding region described above by using the effective slip angle $α_e$.

It should be noted that the sliding friction coefficient $μ_d$ is defined to have the sliding speed dependency as shown in the formula (5).

The formula (6) calculates the longitudinal force $F_x'$ by summing up two terms (i.e., two longitudinal force components). The first term corresponds to the integration within the integral range of 0 to ($l_h/l$), representing an adhesive longitudinal force component generated in the adhesive region. The second term corresponds to the integration within the integral range of ($l_h/l$) to 1, representing a sliding longitudinal force component generated in the sliding region.

The formula (7) calculates the lateral force $F_y'$ by summing up two terms (i.e., two lateral force components). The first term corresponds to the integration within the integral range of 0 to ($l_h/l$), representing an adhesive lateral force component generated in the adhesive region. The second term corresponds to the integration within the integral range of ($l_h/l$) to 1, representing a sliding lateral force component generated in the sliding region.

In the formula (8), the first term corresponds to the integration within the integral range of 0 to ($l_h/l$), representing a torque component generated by the adhesive lateral force component generated in the adhesive region. The second term corresponds to the integration within the integral range of ($l_h/l$) to 1, representing a torque component generated by the sliding lateral force component generated in the sliding region. In the formula (8), in addition to the above-mentioned two torque components, other torque components, that is, a third term and a fourth term are provided. The third term and the fourth term correspond to terms which are proportional to "($l_h/l$)×tan $α_e$". As will be explained later, these third and fourth terms represent torque components around the tire center O, which are generated by the amount of shift of the contact patch of the tire and a longitudinal force of the tire when the contact patch of the tire has shifted in a lateral direction due to the slip angle α. More specifically, the torque $M_z'$ is calculated by the sum of three torque components, i.e., the torque component generated by the adhesive lateral force, the torque component generated by the sliding lateral force, and the torque component generated by the longitudinal force.

The adhesive lateral force component in the first term of the formula (7) corresponds to the lateral force in the adhesive region. In the formula (7), the adhesive lateral force component is calculated by formulating lateral displacement of the tread part due to the effective slip angle $α_e$ being reduced by the lateral bending deformation of the belt.

The sliding lateral force component in the second term corresponds to the lateral force in the sliding region. In the formula (7), the profile of the contact pressure distribution p(t) generated by the effective slip angle $α_e$ is expressed by the function $D_{gsp}$ (t;n, q) to calculate the sliding lateral force component.

It should be understood that this embodiment exemplifies a tire dynamic model in which both the lateral stiffness and the longitudinal stiffness is represented by the same value $K_t$. Alternatively, in the present invention, assuming that both the lateral stiffness and the longitudinal stiffness are different from each other, which is caused by a tread pattern formed in the tire tread part, both the lateral stiffness and the longitudinal stiffness may be set as different parameters. In this case, in a case where the lateral stiffness is $K_t$ and the longitudinal stiffness is $K_x$, the value $K_t$ contained in the first term of the formula (6) may be defined as $K_x$, and the value $K_t$ contained in the third term of the formula (8) may be defined as $K_x$, whereby these values are preferably determined as independent non-linear parameters.

Also, as to the sliding friction coefficient $μ_d$ in the sliding region, sliding friction coefficients may be handled as different parameters from each other between the lateral direction and the longitudinal direction, which is caused by a tread pattern formation.

Figure 4C:
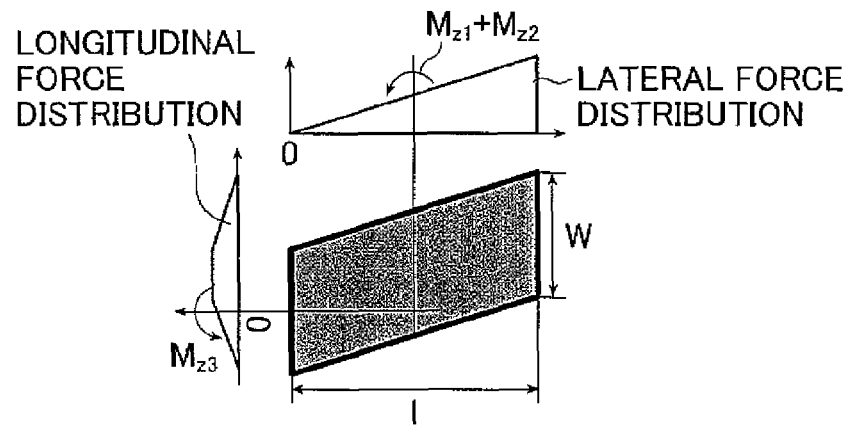

FIGS. 4A to 4C show the relationship between the torque component and a group of the effective slip angle $α_e$, the adhesive lateral force component relaxed by deformation of the belt part and the longitudinal force component, in which the contact patch is schematically illustrated.

FIG. 4A shows the state where, when the slip angle α is given, the torque generated by the slip angle α acts on the tire itself to reduce the slip angle α to become the effective slip angle $α_e$. FIG. 4B shows the relationship between the lateral displacement caused by the effective slip angle $α_e$ and the lateral displacement caused by the lateral bending deformation of the belt. FIG. 4C shows a mechanism in which the longitudinal force distribution generated by a lateral shift of the contact patch of the tire due to the lateral force contributes to the torque $M_z'$. In FIG. 4C, $M_{z1}$ and $M_{z2}$ represent a torque component by the adhesive lateral force component and a torque component by the sliding lateral force component, and $M_{z3}$ is a torque component by the longitudinal force acting on the contact patch.

Figure 7:
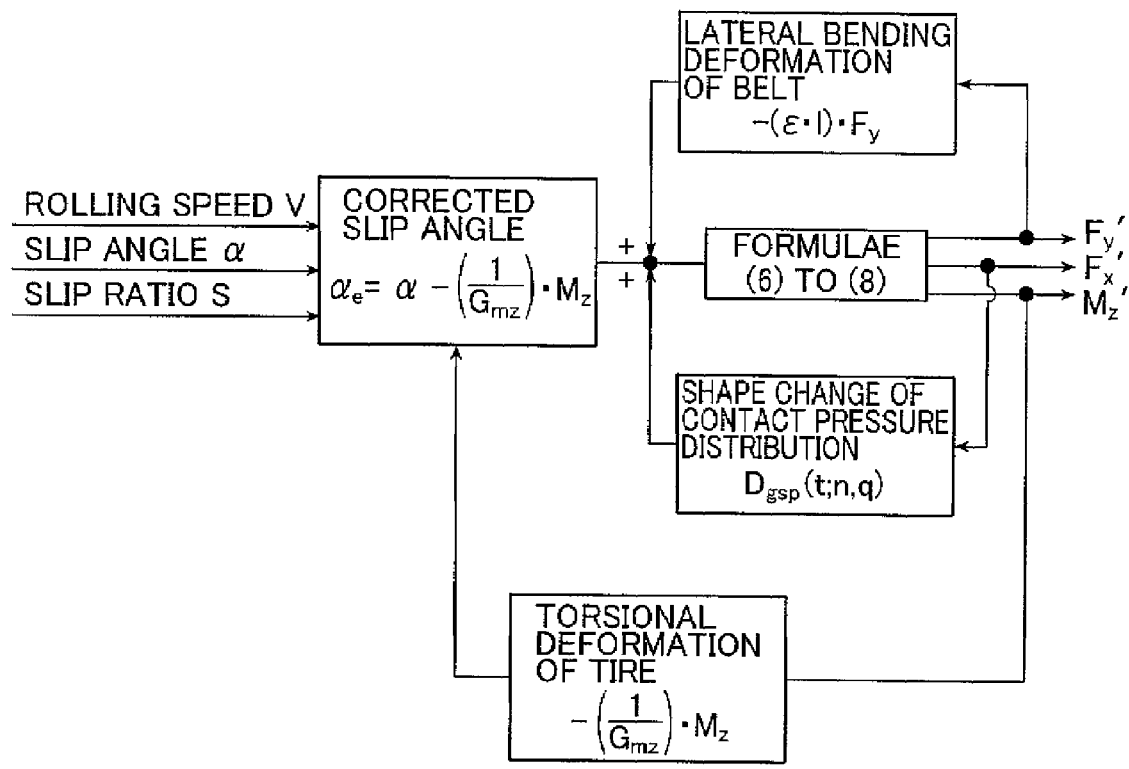
FIG. 7 A block diagram showing a process of calculating a longitudinal force, a lateral force, and torque in the tire dynamic model used in the tire abrasion predicting method of the present invention.

FIG. 7 is a processing block diagram up until the longitudinal force $F_x'$, the lateral force $F_y'$, and the torque $M_z'$ are calculated based on the tire dynamic model after the slip ratio S in the braking/driving direction and the slip angle α are given. As can be seen from FIG. 7, in the tire dynamic model used in the present invention, for the calculation of the longitudinal force $F_x'$, the lateral force $F_y'$, and the torque $M_z'$, the lateral bending deformation of the belt part, a change in profile of the contact pressure distribution, and the torsional deformation of the tire are fed back to calculate in accordance with the formulae (6) to (8) In this case, the given lateral force $F_y$ and the torque $M_z$ are used for the lateral bending deformation of the belt part, a change in profile of the contact pressure distribution and the torsional deformation of the tire, which are used to calculate the longitudinal force $F_x'$, the lateral force $F_y'$, and the torque $M_z'$.

It should also be understood that the longitudinal force $F_x'$, the lateral force $F_y'$, and the torque $M_z'$ calculated in the tire dynamic model calculating unit 12 are not always identical with the given longitudinal force $F_x$, the lateral force $F_y$, and the torque $M_z$. However, by sequence processing performed in the tire dynamic element parameter deriving program 14 and the tire axis force/torque data calculating program 16 to be explained later, the longitudinal force $F_x$, the lateral force $F_y$, and the torque $M_z$ are searched in order that the given longitudinal force $F_x$, the lateral force $F_y$, and the torque $M_z$ become substantially identical (i.e., in mechanical equilibrium) with the calculated longitudinal force $F_x'$, the lateral force $F_y'$, and the torque $M_z'$ in the tire dynamic model. As a result, the longitudinal force, the lateral force, and the torque in equilibrium in the tire dynamic model are calculated.

The tire dynamic element parameter deriving program 14 corresponds to a portion where the slip ratio S in the braking/driving direction is changed from, for example, 0 to 1; the slip angle α is changed from, for example, 0 to 20 degrees; and the above-mentioned linear parameter and non-linear parameter are derived in such a manner that the longitudinal force $F_x'$, the lateral force $F_y'$, and the torque $M_z'$ generated when an adhesive region and a sliding region are present on the contact patch are made coincident with the longitudinal force $F_x$, the lateral force $F_y$, and the torque $M_z$ of the given characteristic curve.

Figure 8:
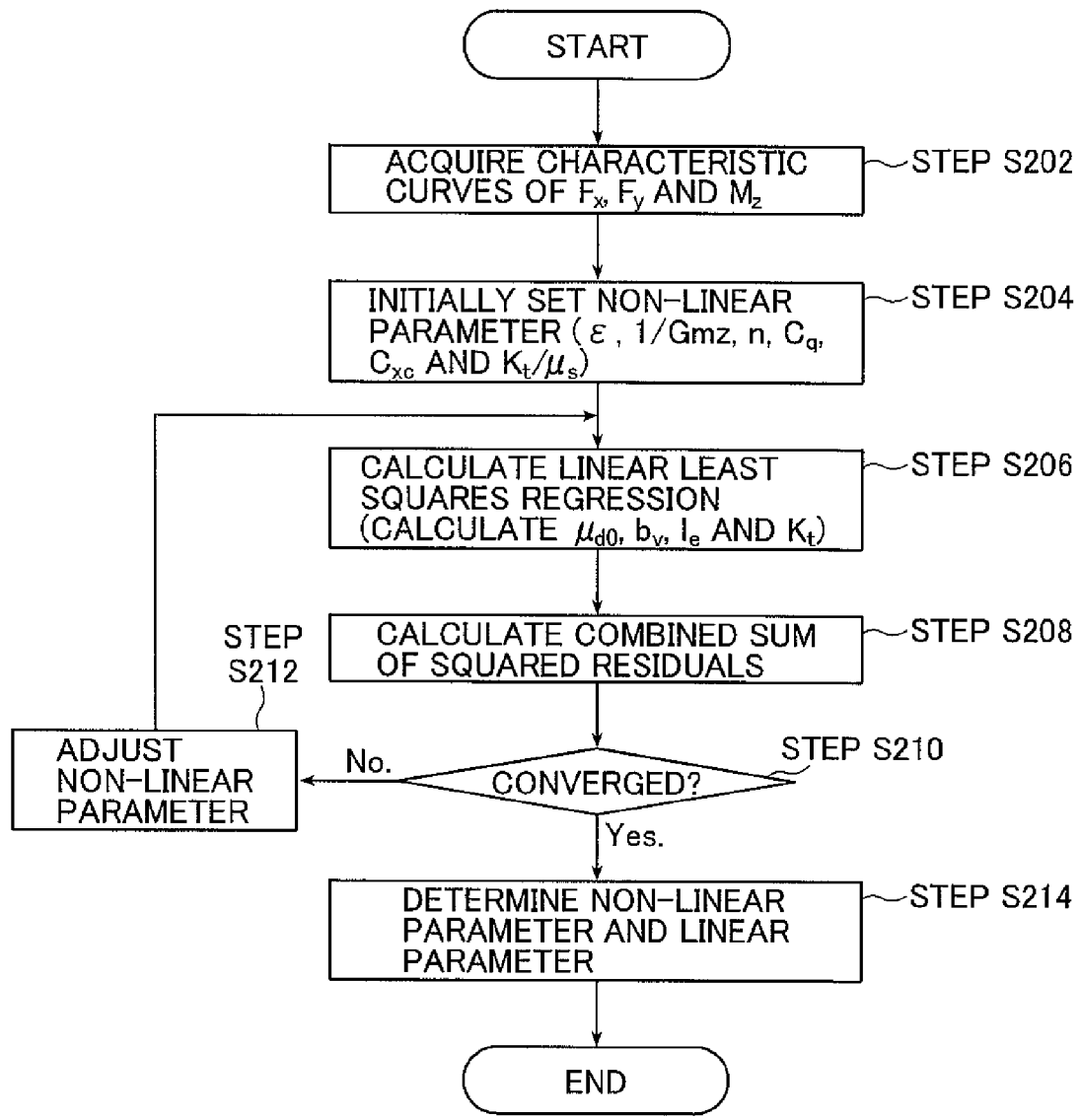
FIG. 8 A flow chart explaining a process flow operation performed in the tire abrasion predicting method of the present invention.

FIG. 8 shows a flow chart for representing process operations executed in the tire dynamic element parameter deriving program 14.

Specifically, as indicated in FIG. 8, while the slip angle is changed from 0 to 20 degrees under a condition that the slip ratio in the braking/driving direction is changed in a various manner under constant load weight, characteristic curves as to the longitudinal force $F_x$, the lateral force $F_y$, and the torque $M_z$ are acquired (step S202). Pieces of data of the characteristic curves are acquired through the interface 6, and then, are stored in the memory 4.

Next, an initial setting operation is carried out, that is, the lateral bending coefficient ε, the torsional compliance $(1/G_{mz})$, the coefficient n, the ratio coefficient $C_q$ of the ratio $K_t/\mu_s$ between the longitudinal stiffness/lateral stiffness and the adhesive friction coefficient, and the shift coefficient $C_{xc}$, all of which serves as the non-linear parameters, are initially set to predetermined values (step 204).

Next, the linear least squares regression is performed by using the characteristic curves of the longitudinal force $F_x$, the lateral force $F_y$, and the torque $M_z$, and also the initially set non-linear parameters (step S206). Specifically, a normal equation is formed which is related to the sliding friction coefficient $\mu_{d0}$, the coefficient $b_y$, and the linear parameter of the longitudinal stiffness/lateral stiffness $K_t$ at the sliding speed of 0. Then, this formed normal equation is solved to calculate values of linear parameters. In other words, the linear least squares regression is carried out. In this case, the normal equation includes equations related to the linear parameters, which are obtained by partially differentiating the sum of squared residuals by each of the above-mentioned linear parameters to give partial differential values zero, thereby the equations are identical with the linear parameters in number.

The non-linear parameter values which have been initially set in the above-mentioned manner, the linear parameter values calculated by using the normal equation, and the characteristic curve data as to the longitudinal force $F_x$, the lateral force $F_y$, and the torque $M_z$ are applied to the tire dynamic model calculating program 12. By the above-mentioned data application, the longitudinal force $F_x'$, the lateral force $F_y'$, and the torque $M_z'$ at the slip angle α and the slip ratio S in the braking/driving direction are calculated in accordance with the flow operation of the block diagram shown in FIG. 7.

Next, a calculation is made of a combined sum of squared residuals $Q_c$ which is expressed by the below-mentioned formula (10) by using these calculated data as to the longitudinal force $F_x'$, the lateral force $F_y'$, and the torque $M_z'$, and the characteristic curve data as to the longitudinal force $F_x$, the lateral force $F_y$, and the torque $M_z$ at the applied slip angle α (step S208). In this case, symbol N indicated in the formula (10) corresponds to a condition setting number of the slip ratio S in the braking/driving direction, and the slip angle α, which are to be applied. Also, weighting coefficients $g_x$, $g_y$, and $g_m$ at this time are obtained from variances of the longitudinal force $F_x$, the lateral force $F_y$, and the torque $M_z$ under a condition of N pieces of the slip angles and the slip ratio in the braking/driving direction.

[Formula 1]

$$Q_c = \quad (10)$$
$$g_x \cdot \sum_{i=1}^{N} (F_{xi} - F'_{xi})^2 + g_y \cdot \sum_{i=1}^{N} (F_{yi} - F'_{yi})^2 + g_m \cdot \sum_{i=1}^{N} (M_{zi} - M'_{zi})^2$$

Also, assuming now that for the data of the longitudinal force $F_x$, the lateral force $F_y$, and the torque $M_z$, variances of the longitudinal force $F_x$, the lateral force $F_y$, and the torque $M_z$, under a condition of N pieces of slip angles and slip ratios, are represented by $\sigma_x^2$, $\sigma_y^2$, and $\sigma_m^2$ then $g_x$, $g_y$, and $g_m$ are coefficients which are expressed by the below-mentioned formulae, and also, the $g_x$, $g_y$, and $g_m$ are weighting coefficients which are used when the combined sum of squared residuals $Q_c$ is calculated.

$g_x = 1/\sigma_x^2$ $g_y = 1/\sigma_y^2$ $g_m = 1/\sigma_m^2$

That is to say, the combined sum of squared residuals $Q_c$ is obtained by weighted summation of the respective sums of the squared residuals of the longitudinal force, the lateral force, and the torque, using inverse numbers of variances as weighting coefficients, the variance corresponding to information of variations in the characteristic curves.

As described above, the combined sum of squared residuals is calculated by adding: the results of multiplication of the sum of squared residuals by the weighting coefficient $g_x$, where the residuals are defined between the value of the characteristic curve of the longitudinal force $F_x$ and the value of the longitudinal force $F_x'$ calculated by the tire dynamic model calculating program 12; the results of multiplication of the sum of squared residuals by the weighting coefficient $g_y$, where the residuals are defined between the value of the characteristic curve of the lateral force $F_y$ and the value of the lateral force $F_y'$ calculated by the tire dynamic model calculating program 12; and the results of multiplication of the sum of squared residuals by the weighting coefficient $g_m$, where the residuals are defined between the value of the characteristic curve of the torque $M_z$ and the value of the torque $M_z'$ calculated by the tire dynamic model calculating program 12. In this case, the reason for using the combined sum of squared residuals is as follows. That is, similar to the above-mentioned case, it is necessary that the longitudinal force $F_x'$, the lateral force $F_y'$, and the torque $M_z'$, under a condition of the plurality of slip angles and the plurality of slip ratios, are made coincident with the longitudinal force $F_x$, the lateral force $F_y$, and the torque $M_z$, respectively, at the same time.

Further, it is determined whether or not the combined sum of squared residuals becomes a predetermined value or less and is converged (step S210).

If it is determined that the combined sum of squared residuals is not converged, the non-linear parameters initially set in step S204 are adjusted (step S212). The non-linear parameters are adjusted in accordance with, for example, a Newton-Raphson method.

These non-linear parameters are adjusted until it is judged that the combined sum of squared residuals converges in the step S210. Every time these parameters are adjusted, the linear least squares regression (step S206) and calculation of the combined sum of squared residuals (step S208) are conducted so as to obtain the combined sum of squared residuals in accordance with the formula (10). Then, the non-linear parameters are adjusted until the combined sum of squared residuals becomes a predetermined value or less. When the combined sum of squared residuals becomes a predetermined value or less, respective linear parameters which are calculated by the linear least squares regression are determined (step S214). These determined dynamic element parameter values are stored in the memory 4.

The above-mentioned process operations are flow operations carried out by the tire dynamic element parameter deriving program 14 for deriving both the linear parameter values and the non-linear parameter values under the slip ratios S in the braking/driving direction and the slip angles $\alpha$, by using the tire dynamic model.

The tire axis force/torque data calculating program 16 corresponds to a portion for calculating tire axis force/torque data at a predetermined slip angle and a predetermined slip ratio in the braking/driving direction by using both linear parameters and non-linear parameters, which correspond to tire dynamic element parameters in the above-mentioned time dynamic model under predetermined load weight. For instance, while the slip ratio S in the braking/driving direction is constant, the tire axis force/torque data calculating program 16 acquires characteristic curves where the slip angle $\alpha$ is changed from 0 to 20 degrees. Also, while the slip angle $\alpha$ is constant, the tire axis force/torque data calculating program 16 acquires characteristic curves where the slip ratio S in the braking/driving direction is changed from 0 to 1. Further, while the slip angle $\alpha$ is constant, the tire axis force/torque data calculation program 16 calculates a friction ellipse where a vertical axis is given a lateral force, and a horizontal axis given a longitudinal force.

Figure 9:
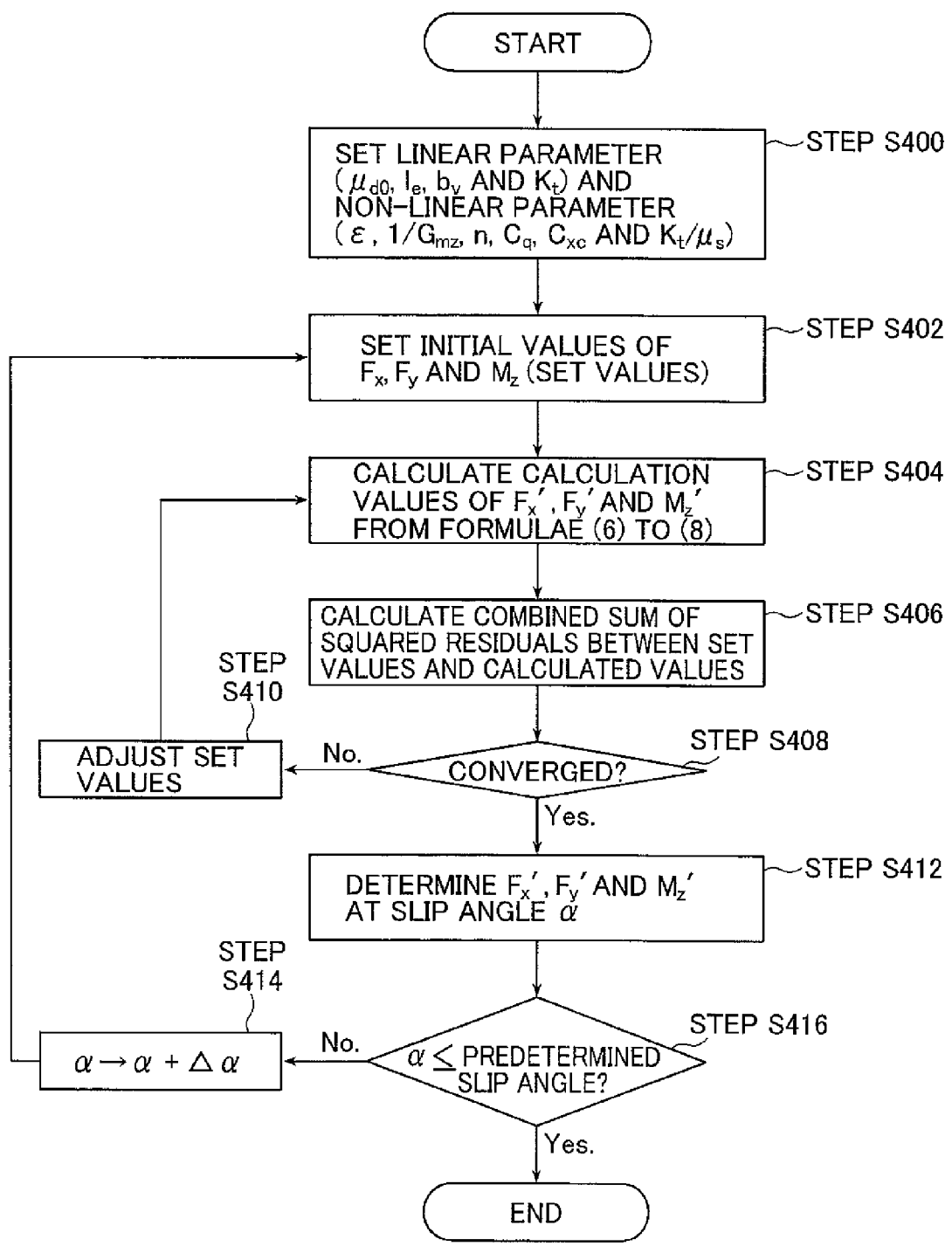
FIG. 9 A flow chart explaining a process flow operation performed in the tire abrasion predicting method of the present invention.

FIG. 9 shows a flow chart for describing an example of process flow operations executed in the tire axis force/torque data calculating program 16. This example shows the calculation of characteristic curves which represent dependency of the longitudinal force, the lateral force, and the torque with respect to the slip angle $\alpha$.

The tire axis force/torque data calculating program 16 first reads out both the derived linear parameters and the derived non-linear parameters from the memory 4, and sets these linear and non-linear parameters (step S400).

Further, a longitudinal force $F_x$, a lateral force $F_y$, and a torque $M_z$ under load weight $F_z$ are set to initial values (step S402).

Thereafter, in the case where a characteristic curve indicative of a slip angle dependency is calculated, the linear parameters and the non-linear parameters, and also, the initially set longitudinal force $F_x$, a lateral force $F_y$, and a torque $M_z$ are applied to the tire dynamic model calculation program 12 in combination with the set slip angle $\alpha = \Delta\alpha$. The tire dynamic model calculating program 12 calculates a longitudinal force $F_x'$, a lateral force $F_y'$, and a torque $M_z'$ in accordance with the formulae (6) to (8) by using the applied linear parameters and non-linear parameters, and also, the initially set longitudinal force $F_x$, lateral force $F_y$, and torque $M_z$ (step S404)

These calculated longitudinal force $F_x'$, lateral force $F_y'$, and torque $M_z'$ are returned to the tire axis force/torque data calculating program 16. The tire axis force/torque data calculating program 16 calculates a combined sum of squared residuals between the set values of the longitudinal force $F_x$, the lateral force $F_y$, and the torque $M_z$ applied to the tire dynamic model calculating program 12, and the calculated values of longitudinal force $F_x'$, lateral force $F_y'$, and torque $M_z'$, in accordance with the formula (10) (step S406).

Next, it is determined whether or not the calculated combined sum of squared residuals becomes a predetermined value or less and is converged (step S408).

If it is determined that the combined sum of squared residuals is not converged, the previously set values of the longitudinal force $F_x$, the lateral force $F_y$, and the torque $M_z$ are adjusted (step S410). These adjusted longitudinal force $F_x$, lateral force $F_y$, and torque $M_z$, and both the linear parameters and the non-linear parameters are again applied to the tire dynamic model calculating program 12.

The set values of the longitudinal force $F_x$, the lateral force $F_y$, and the torque $M_z$ are adjusted until the combined sum of squared residuals becomes equal to or smaller than the predetermined value and is converged. The adjusting operation of the set values is carried out in accordance with, for example, the above-mentioned Newton-Raphson method. As explained above, the longitudinal force $F_x'$, the lateral force $F_y'$ and the torque $M_z'$ are determined (step S412).

Next, a judgement is made as to whether or not a slip angle $\alpha$ is equal to or smaller than a predetermined slip angle (step S416).

When it is judged that the slip angle $\alpha$ is equal to or smaller than the predetermined slip angle, the condition of the slip angle $\alpha$ is changed ($\alpha \rightarrow \alpha + \Delta\alpha$) (step S414). Then, initial values of the longitudinal force $F_x$, the lateral force $F_y$, and the torque $M_z$ at the changed slip angle $\alpha$ are set (step S402); the longitudinal force $F_x'$, the lateral force $F_y'$, and the torque $M_z'$ are calculated (step S404); and a combined sum of squared residuals is calculated (step S406). Then, a judgement is made as to whether or not this combined sum of squared residuals is converged (step S408).

The slip angle $\alpha$ is repeatedly changed until the slip angle $\alpha$ becomes equal to the predetermined slip angle (step S416). Every time this slip angle $\alpha$ is changed, the longitudinal force $F_x'$, the lateral force $F_y'$, and the torque $M_z'$ are calculated to determine the converged longitudinal force $F_x'$, the converged lateral force $F_y'$, and the converged torque $M_z'$. The determined longitudinal force $F_x'$, lateral force $F_y'$, and torque $M_z'$ are stored in the memory 4.

As previously explained, the characteristic curves of the longitudinal force, the lateral force, and the torque which depend upon the slip angle $\alpha$ are obtained.

The sliding amount calculating program 18 corresponds to a portion in which "$l*[S^2 + \{\tan(\alpha_e) - (\epsilon \cdot l)F_y(1 - l_h/l)\}^2]^{(1/2)}$" in the formula (4) is calculated every time the tire axis force/torque data calculating program 16 calculates the converged longitudinal force, the converged lateral force, and the converged torque and the calculation result is set as a sliding amount of a tire.

Figure 10:
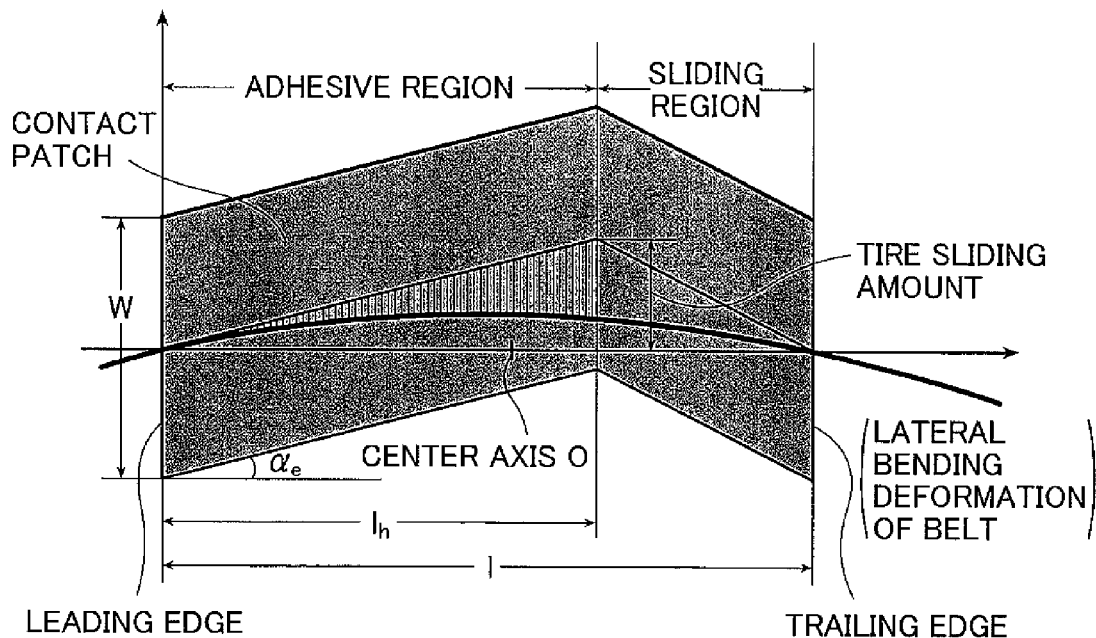
FIG. 10 Another explanatory diagram explaining a tire dynamic model used in the tire abrasion predicting method of the present invention.

As indicated in FIG. 10, "$1*[S^2+\{\tan(\alpha_e)-(\epsilon \cdot 1)F_y(1-l_h/l)\}^2]^{(1/2)}$" which corresponds to a deformation at the boundary position ($l_h/l$) between the adhesive region and the sliding region is considered the tire sliding amount. The calculated tire sliding amount is stored in the memory 4.

The abrasion characteristic predicting program 20 corresponds to a portion in which the sliding amount of the tire calculated by the sliding amount calculating program 18 and stored in the memory 4 is used in combination with abrasion characteristic data of a tread rubber part in order to predict an abrasion characteristic of a tread part of the tire when a predetermined lateral force is generated.

For the abrasion characteristic of the tread rubber part, several material data of rubber parts acquired by the testing method defined in the new JIS K6264 are memorized as a database in advance, and predicting a multiplication result as an abrasion characteristic of a tire, where the multiplication result is made by multiplying one of material data by a sliding amount of the tire when a predetermined lateral force is generated.

As the material data of the rubber part, for instance, an abrasion amount per unit move distance is calculated, which is obtained by measuring an abrasion amount using a ring-shaped test piece through the DIN abrasion testing method. Alternatively, the abrasion amount as the rubber material may be expressed as an index number in such a way that a reference rubber part is previously determined, and an abrasion amount of this reference rubber member is used as a reference.

As the rubber material data of the rubber part, a breaking elongation $E_b$, a breaking strength $T_b$, and breaking energy $E_b*T_b$ may be used in addition to the above-mentioned values. In this case, it is desirable to use the index number, where the value of the reference rubber part is used as the reference value.

Either the numeral values or the index number as the predicted result of the abrasion characteristic calculated in the above-mentioned manner is displayed on the output apparatus 7, or printed out.

The apparatus 1 is arranged in the above-mentioned manner.

The apparatus 1 may function as an apparatus in which the slip ratio in the braking/driving direction is applied to the tire to calculate the tire sliding amount when the sliding region is formed on the contact patch, so as to conduct prediction of the abrasion characteristic of the tire. The above-mentioned apparatus is arranged by executing the below-mentioned program which causes a computer to execute a predetermined function.

Such a program may comprise the procedures of:

causing the memory 4 of the computer to store a characteristic curve of a tire axis force and a self-aligning torque generating at a tire rotation axis, the characteristic curve acquired when a slip ratio in the braking/driving direction is applied to a tire and, the characteristic curve being changed with respect to the slip ratio in the braking/driving direction;

causing a calculation unit of the computer to derive tire dynamic element parameter values which determines this characteristic curve from the characteristic curve stored in the memory 4, based on a tire dynamic model constructed by using a plurality of tire dynamic element parameters;

causing the calculating unit of the computer to calculate a sliding amount of a tire from a sliding region after the derived tire dynamic element parameter values are applied to the tire dynamic model to calculate both the adhesive region and the sliding region, which are formed between the tire and the contact patch; and causing the calculation unit of the computer to evaluate a tread abrasion characteristic of the tire at the slip ratio in the braking/driving direction given, by using this tire sliding amount in combination with the abrasion characteristic data of a tread rubber part of the tire.

Figure 11:
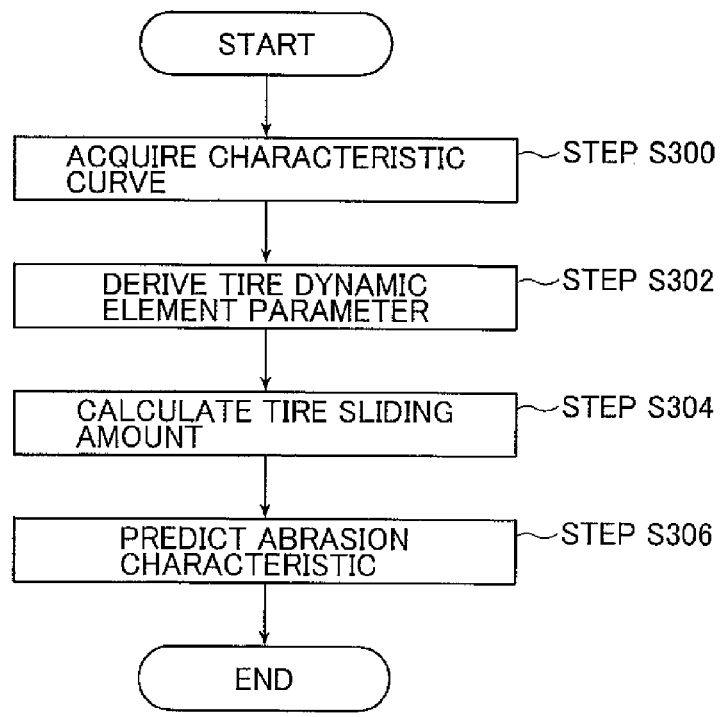
FIG. 11 A flow chart explaining process flow operations of the tire abrasion predicting method of the present invention.

FIG. 11 shows a flow chart for describing a tire abrasion characteristic predicting method according to the present invention, which is executed by using the above-mentioned apparatus 1.

First, in the tire dynamic element parameter deriving program 8, characteristic curves where the slip angle is changed from 0 to 20 degrees under a condition that the slip ratio in the braking/driving direction is varied in a various manner are acquired by recalling measurement data of the characteristic curves stored in the memory 4 (step S300) As of the characteristic curves, the measurement data were acquired by using, for instance, indoor testing machines such as FLAT TRAC-I, FLAT TRAC-II, FLAT TRAC-III (product names of MTS Co.), and the like.

Next, the tire dynamic model calculating program 12 is executed to derive values of tire dynamic element parameters by using the acquired characteristic curve values, the parameters containing both the linear parameters and the non-linear parameters defined in the tire dynamic model (step S302).

Next, by using the derived tire dynamic element parameter values, the tire axis force/torque data calculating program 16 calculates a characteristic curve at the predetermined slip ratio S in the braking/driving direction, and calculates a tire sliding amount at a predetermined lateral force generation (step S304). The tire sliding amount is "$1*[S^2+\{\tan(\alpha_e)-(\epsilon \cdot 1)F_y(1-l_h/l)\}^2]^{(1/2)}$" which corresponds to the deformation at the boundary position ($l_h/l$).

Next, an abrasion characteristic is predicted by multiplication of the calculated tire sliding amount, the contact width of the tire and the rubber material data after deriving the rubber material data of the tread part from the database stored in the memory 4 (step S306).

The rubber material data corresponds to, for example, data as to an indoor abrasion test result of a rubber part, and is expressed by an index number in which a predetermined reference rubber part is a reference for breaking energy ($E_b*T_b$).

As explained above, the calculation result obtained by multiplication of the tire sliding amount, the rubber material data and the contact width is outputted by the output apparatus 7.

The above-mentioned tire abrasion prediction method may be used for designing a tire.

Figure 12:
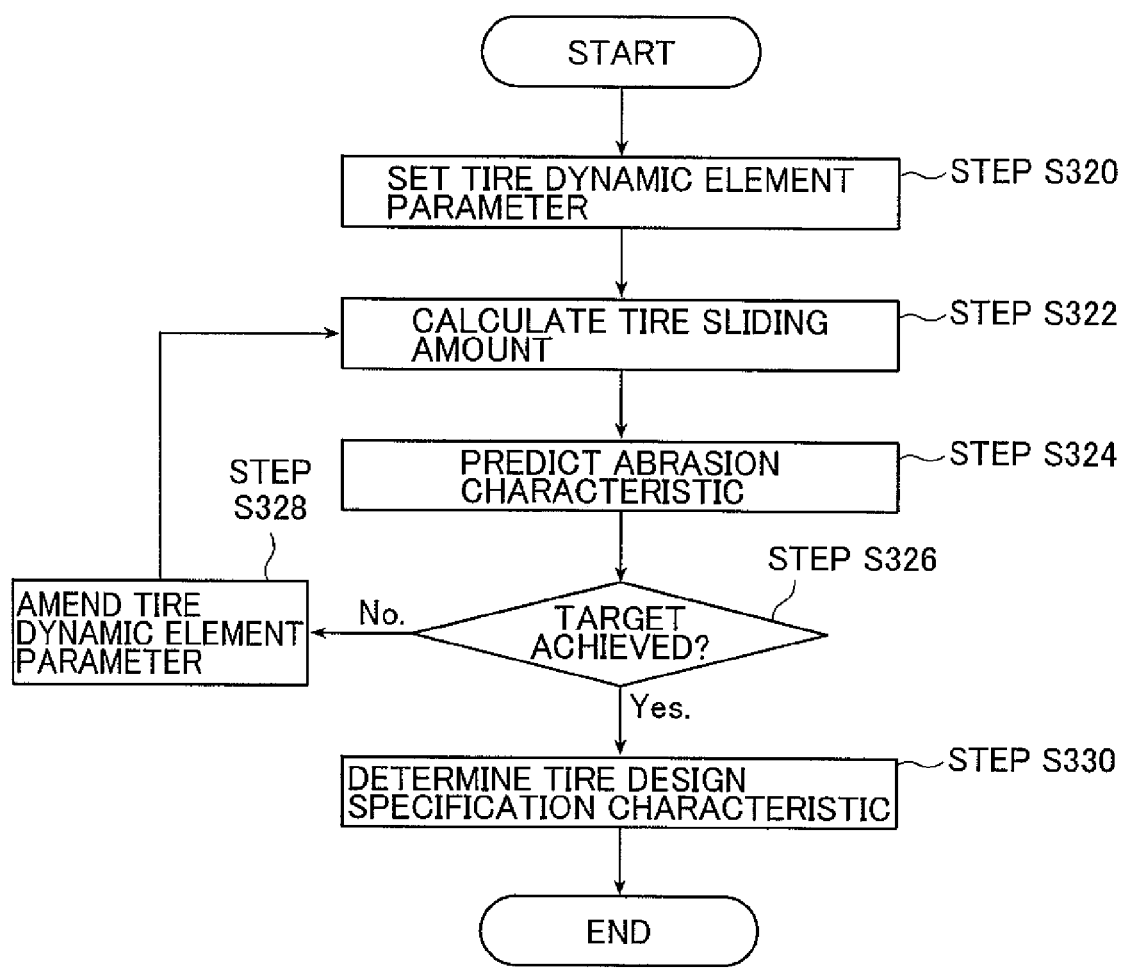
FIG. 12 A flow chart explaining process flow operations of a tire designing method of the present invention.

FIG. 12 shows a flow chart for explaining flow operations of a tire designing method.

First, values of tire dynamic element parameters are set (step S320).

By using these set values of the tire dynamic element parameters, the tire axis force/torque data calculating program 16 calculates a tire axis force and a torque value in a predetermined slip ratio S in the braking/driving direction and a predetermined slip angle, and calculates a tire sliding amount at a predetermined tire axis force (i.e., lateral force) generation (step S322). As previously explained in the step S306, an abrasion characteristic is predicted by using this tire sliding amount (step S324). A judgment is made as to whether or not the predicted abrasion characteristic reaches a predetermined target (step S326). As a result of this judgement, if the predicted abrasion characteristic does not reach the target, the values of the tire dynamic element parameter are amended (step S328). The amended tire dynamic element parameters are returned to the step S322. In this step S322, a tire sliding amount is again calculated. In the step S326, the tire dynamic element parameters are repeatedly amended until the predicted abrasion characteristic reaches the target in the above-mentioned manner. Although the amending method is not specifically limited, the values of the tire dynamic element parameters are amended in a stepwise manner by using, for instance, a predetermined change amount.

Finally, the values of the tire dynamic element parameters which can achieve the target value are determined as a tire designing specification characteristic (step S330), and a tire structural designing operation containing a tire shape designing and a material designing operation containing a compound designing operation of a rubber part are carried out based on this determined tire designing specification characteristic.

The tire thus designed is manufactured to satisfy the tire designing specification characteristic.

As to the tire abrasion predicting method of the present invention, there has been explained the method for predicting the tire abrasion characteristic at a predetermined slip ratio in the braking/driving direction and a predetermined slip angle based on the characteristic curves at the slip ratio in the braking/driving direction and the slip angle applied to the tire. According to the present invention, it is also possible to predict an abrasion characteristic of a tire during cornering operation from a characteristic curve of a slip angle dependency by setting the slip ratio in the braking/driving direction to 0.

Figure 13:
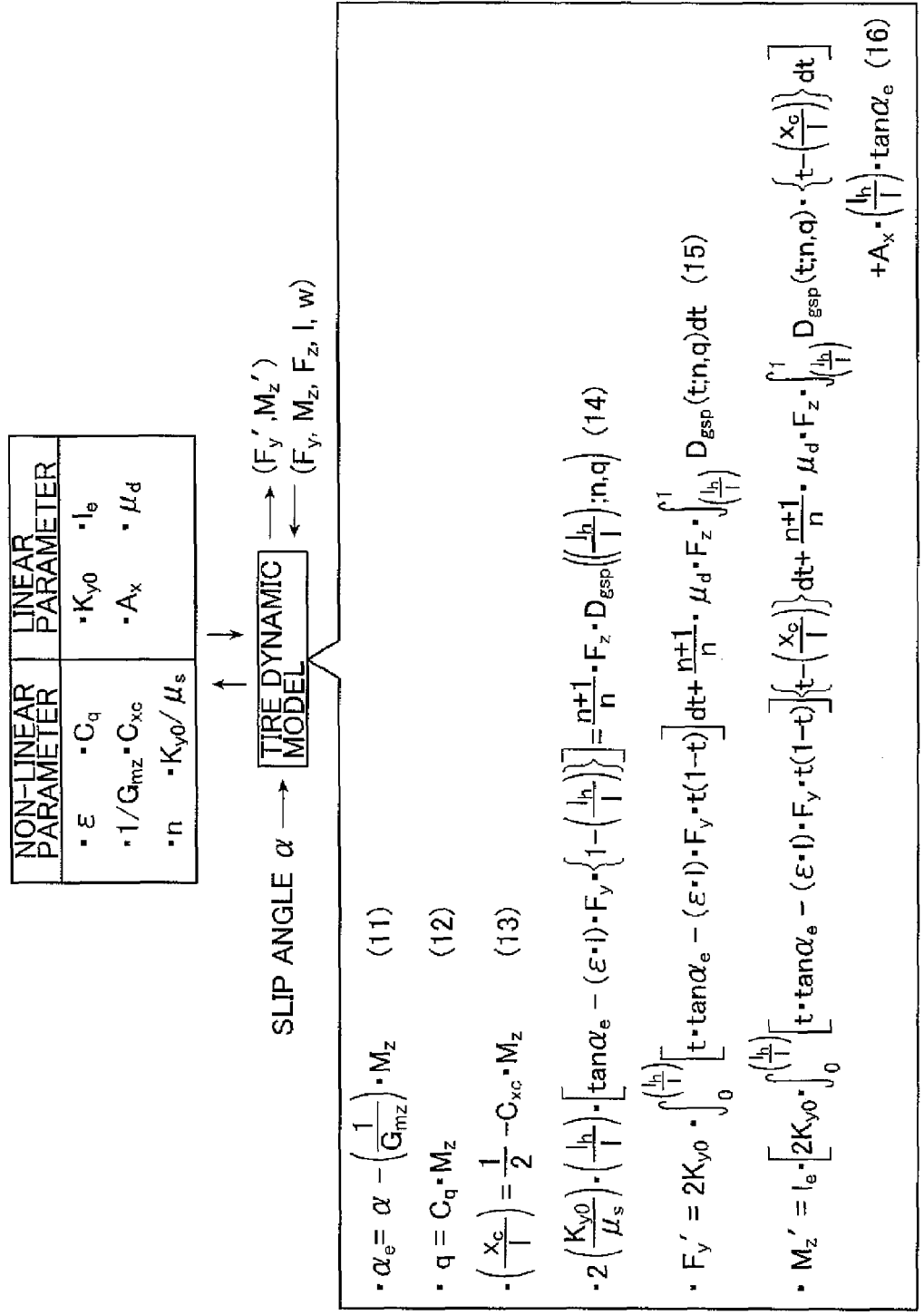
FIG. 13 An explanatory diagram explaining a tire dynamic model used as another embodiment used in the tire abrasion predicting method of the present invention.

FIG. 13 shows an explanatory diagram for explaining a tire dynamic model at this time.

Formulae (11) to (16) indicative of the tire dynamic model shown in FIG. 13 are identical to the formulae which are obtained when the slip ratio S in the braking/driving direction is set to 0 in the formulae (1) to (8) of the dynamic model indicated in FIG. 3, except that $F_x$ in the formulae (2) and (3) is replaced by $M_z$, and the third term and the fourth term in the formula (8) are different.

In this case, $A_x$ in the formula (16) of FIG. 13 corresponds to a longitudinal stiffness $A_x$ within a contact patch, and also is such a linear parameter that gives an influence to torque $M_z'$ due to the movement of the contact patch in the lateral direction.

Figure 14:
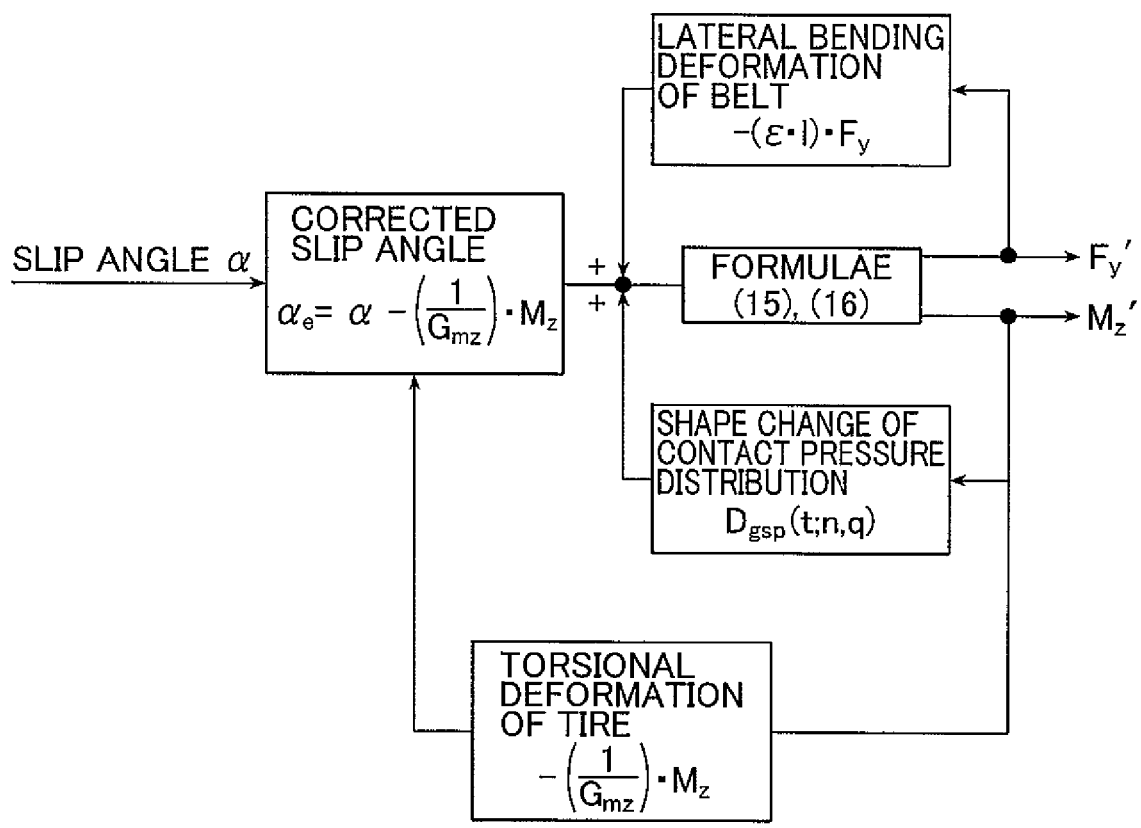
FIG. 14 A block diagram showing a process of calculating a lateral force and torque in the tire dynamic model shown in FIG. 13.

Also, FIG. 14 shows a process block diagram explaining a process of calculating a lateral force $F_y'$ and torque $M_z'$ based on a tire dynamic model after the application of a slip angle α. As can be seen from FIG. 14, a tire dynamic model is calculated in such a manner that, when the lateral force $F_y'$ and the torque $M_z'$ are calculated, a lateral bending deformation of a belt, a shape change of a contact pressure distribution, and a torsional deformation of the tire are fed back in the formulae (15) and (16). It should be understood that both a lateral force $F_y$ and torque $M_z$ which are to be applied are used for the lateral bending deformation of the belt, the shape change of the contact pressure distribution, and the torsional deformation of the tire, which are used to calculate both the lateral force $F_y'$ and the torque $M_z'$.

In the tire dynamic element parameter deriving program 14 which derives the tire dynamic element parameters by using such a tire dynamic model, when characteristic curves of both a lateral force and torque are applied, values of the tire dynamic element parameters are derived in such a manner that these parameter values are fitted to these two characteristic curves.

In this case, a combined sum of squared residuals $Q_c$ is calculated in accordance with the below-mentioned formula (17). In this case, symbol N in the formula (17) is a condition setting number of a slip angle α to be applied. Also, at this time, weighting coefficients $g_y$ and $g_m$ are calculated from variances of the lateral force $F_y$ and the torque $M_z$ under a condition of N pieces of slip angles.

[Formula 2]

$$Q_c = g_y \cdot \sum_{i=1}^{N} (F_{yi} - F'_{yi})^2 + g_m \cdot \sum_{i=1}^{N} (M_{zi} - M'_{zi})^2 \qquad (17)$$

Moreover, in the tire abrasion predicting method of the present invention, it is also possible to predict an abrasion characteristic of a tire at the tire braking operation or the tire driving operation based on a characteristic curve of a slip ratio dependency in the braking/driving direction by setting the slip angle to 0.

FIG. 15 shows an explanatory diagram for explaining a tire dynamic model at this time.

Formulae (21) to (24) indicative of the tire dynamic model shown in FIG. 15 are identical to the formulae which are obtained by setting the slip angle to 0 with respect to the formulae (1) to (8) in the dynamic model indicated in FIG. 3.

Figure 16A:
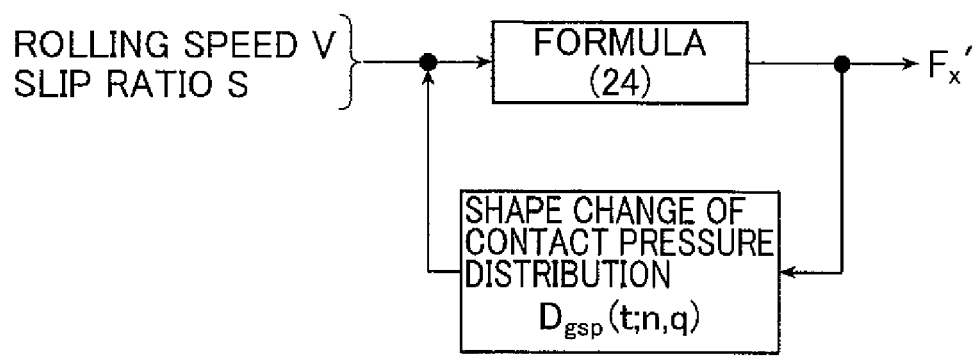

FIG. 16A shows a block diagram of the process up until a longitudinal force $F_x'$ is calculated based on a tire dynamic model to which a slip ratio S in the braking/driving direction and a rolling speed V are applied. As can be understood from FIG. 16A, the tire dynamic model is calculated in the formula (24) by feeding back a shape change of a contact pressure distribution when the longitudinal force $F_x'$ is calculated.

Figure 16B:
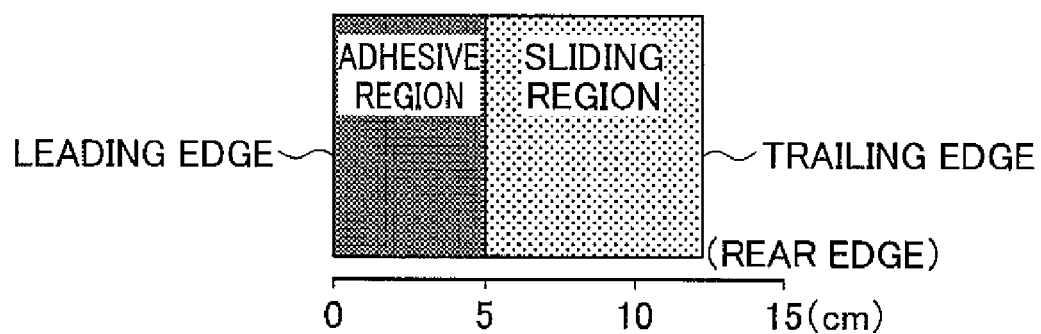
FIG. 16B shows an explanatory diagram explaining an adhesive region and a sliding region in the tire dynamic model shown in FIG. 15.

FIG. 16B shows an explanatory diagram for explaining both an adhesive region and a sliding region within a contact patch at this time.

In FIG. 16B, a position separated from a leading edge by 5 cm corresponds to $l_h$, and a displacement amount of a tread part in the a longitudinal direction at this position with respect to a road surface is defined as a sliding amount.

In the tire dynamic element parameter deriving program 14 which derives the values of the tire dynamic element parameters by using such the tire dynamic model, when a characteristic curve of a slip ratio dependency in the braking/driving direction of the longitudinal force is given, values of the tire dynamic element parameters are derived so as to fit to this characteristic curve.

In this case, the combined sum of squared residuals $Q_c$, which is used for judging whether or not the combined sum of squared residuals $Q_c$ is converged, corresponds to the sum of squared residuals between the value of the longitudinal force $F_x$ in the characteristic curve and the value of the longitudinal force $F_x'$ calculated by using the tire dynamic model.

Figure 17A:
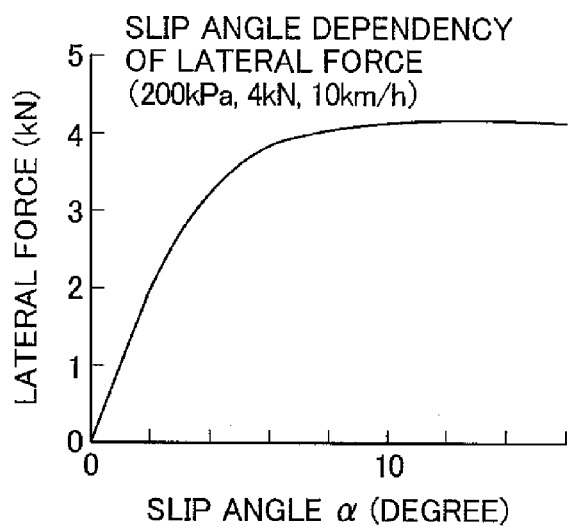
Figure 17B:
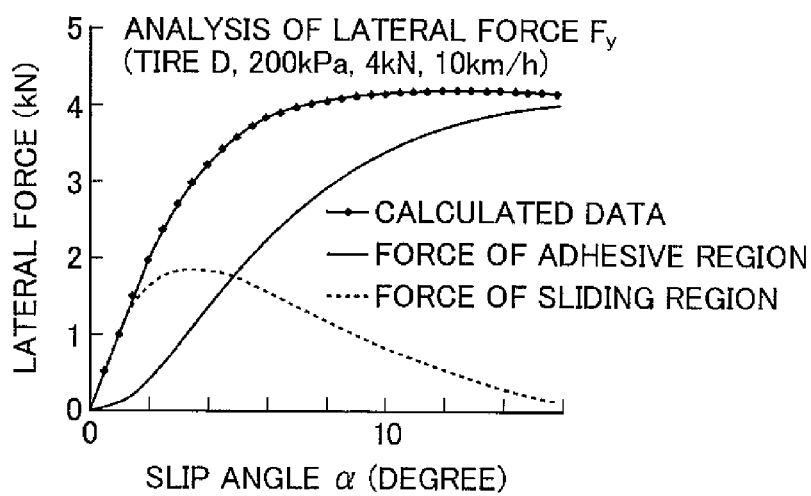
FIG. 17B shows a diagram explaining an example of calculated data corresponding to the characteristic curve which is calculated in the tire abrasion predicting method of the present invention.
Figure 17C:
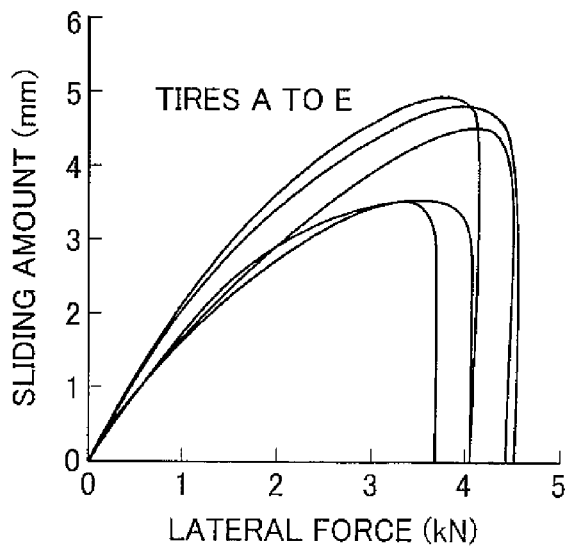
FIG. 17C shows a diagram explaining an example of a sliding amount of the tire calculated in the tire abrasion predicting method of the present invention.

FIGS. 17A to 17C shows diagrams for representing a tire sliding amount calculated when values of the tire dynamic element parameters are derived from a characteristic curve of a slip angle dependency of a lateral force by using the tire dynamic models shown in FIGS. 13 and 14.

FIG. 17A shows a diagram for representing a characteristic curve of an applied lateral force. FIG. 17B shows a diagram for explaining calculated data of the lateral force which is calculated by using values of the tire dynamic element parameters derived from this characteristic curve. FIG. 17C shows a tire sliding amount which is calculated by using the derived values of the tire dynamic element parameters.

As shown in FIG. 17B, the calculated data of the lateral force truly follows the characteristic curve shown in FIG. 17A, and implies that the values of the tire dynamic element parameters have been derived with high precision. Also, it can been seen that the tire dynamic model corresponds to a model capable of truly following the characteristic curve.

FIG. 17C shows a diagram for showing a lateral force dependency of a tire sliding amount which is calculated by using the values of the tire dynamic element parameters which have been calculated in the above-mentioned manner, and indicates 5 sorts of tires A to E. As can be understood from this drawing, tire sliding amounts are different from each other depending upon the tires.

A tire sliding amount in a predetermined lateral force is used as a typical value among such tire sliding amounts, then the multiplication of the tire sliding amount, rubber material data of a tread part and a contact width of a tire is made as previously explained, to thereby predict an abrasion characteristic of the tire. Specifically, in the case of such an abrasion amount per unit move distance which is obtained by measuring the abrasion amount through a predetermined abrasion test method as the rubber material data, it is judged that the larger the value of the abrasion characteristic is, the more deteriorated the abrasion characteristic is.

Figure 18A:
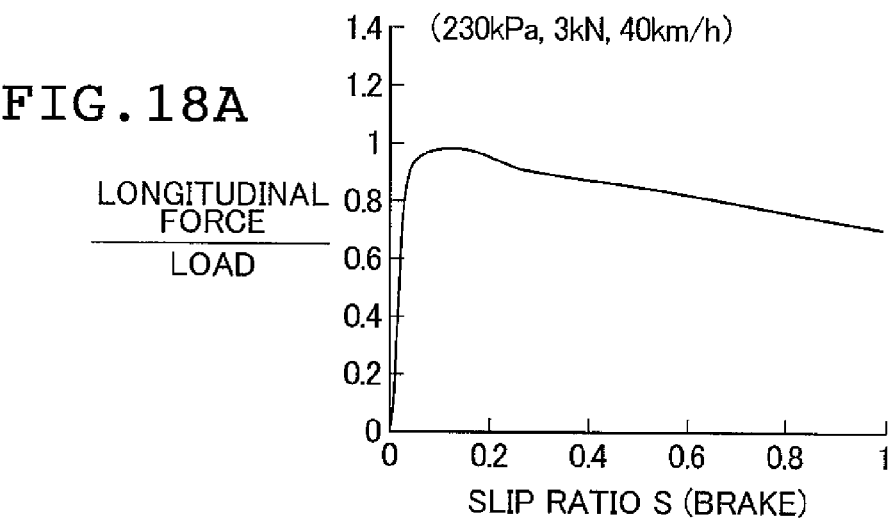
Figure 18B:
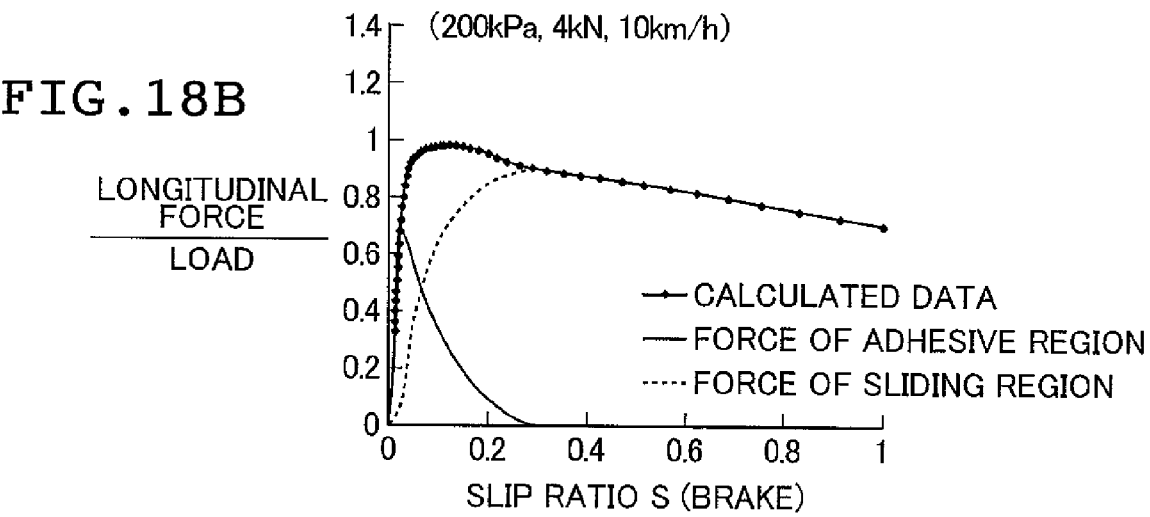
FIG. 18B shows a diagram explaining another example of calculated data corresponding to the characteristic curve which is calculated in the tire abrasion predicting method of the present invention.

FIGS. 18A and 18B show diagrams for showing calculated data and the characteristic curves where the values of the tire dynamic element parameters are derived in accordance with a characteristic curve of a slip ratio dependency of a longitudinal force in the braking/driving direction by using the tire dynamic models shown in FIGS. 15 and 16.

FIG. 18A shows a diagram for representing a characteristic curve of an applied longitudinal force. FIG. 18B shows a diagram for explaining calculated data of the longitudinal force which is calculated by using the values of the tire dynamic element parameters derived from this characteristic curve.

As shown in FIG. 18B, the calculated data of the longitudinal force truly follows the characteristic curve shown in FIG. 18A, and implies that the values of the tire dynamic element parameters have been derived with high precision. Also, it can been seen that the tire dynamic model corresponds to a model capable of truly following the characteristic curve.

Figure 19:
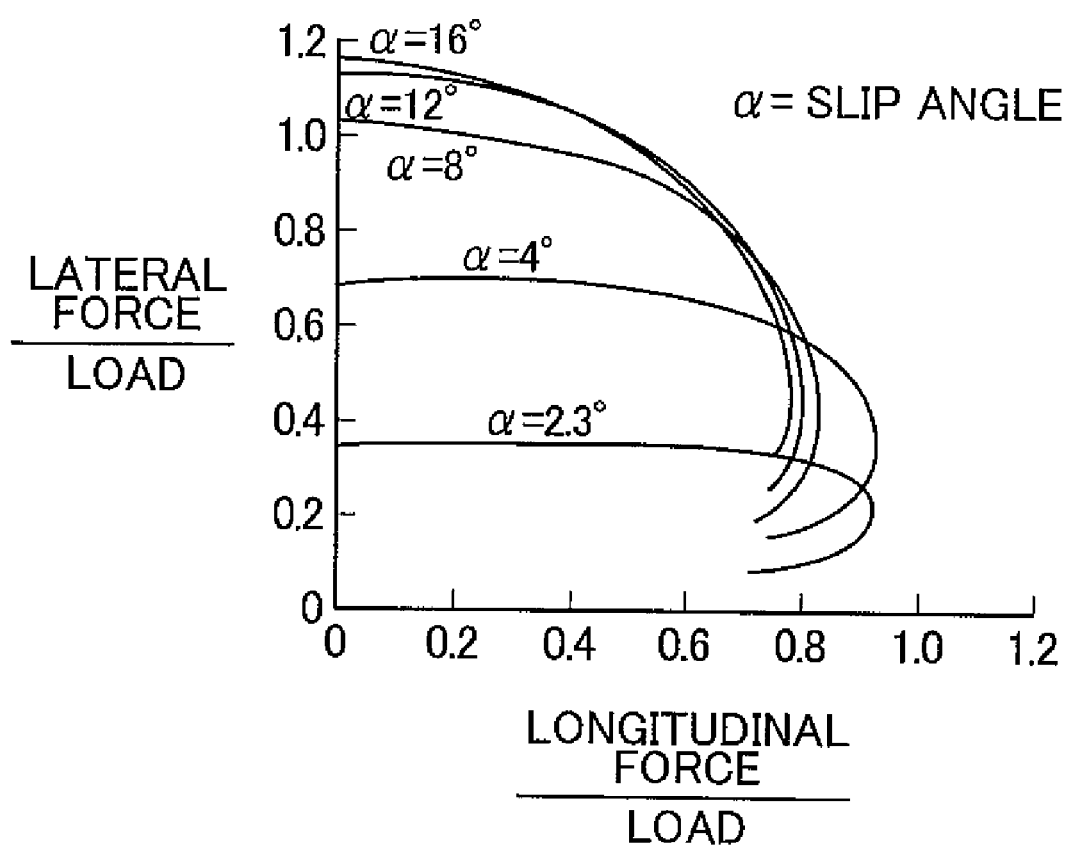
FIG. 19 A diagram showing an example of a friction ellipse calculated in the tire abrasion predicting method of the present invention.

Further, if the tire dynamic element parameters which constitute the tire dynamic model are once derived, both lateral forces and longitudinal forces at different slip ratios in the braking/driving direction and different slip angles can be calculated by using these derived parameters. FIG. 19 shows one example of a relationship between longitudinal forces and lateral forces, which are calculated in the manner described above (friction ellipse where a braking operation is performed in cornering).

A tire sliding amount is calculated by using a tire dynamic model and the tire dynamic element parameters which constitute this model.

Figure 20A:
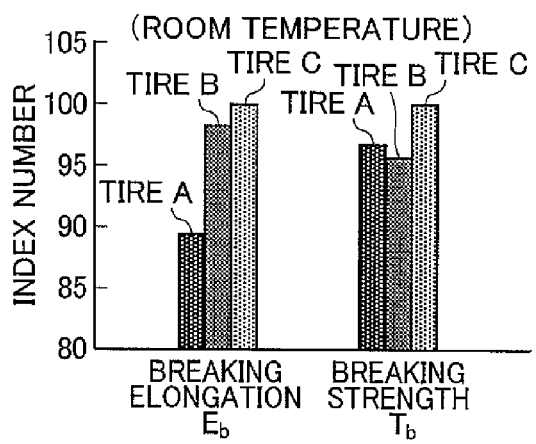

FIG. 20A shows data as to a breaking elongation $E_b$ and a breaking strength $T_b$ as rubber material data of tread rubber parts in the tires A to C. It is considered that the lower the index number becomes, the smaller both the breaking elongation and the breaking strength become; and also, the larger the breaking energy $E_b*T_b$ becomes, the better the abrasion resistance characteristic as the rubber material becomes. From such a technical view, abrasion characteristics of the tires may be predicted as "tire C (superior)>the tire B>the tire A (inferior)" by judging the rubber materials. However, abrasion lifetime in actual tires are given as "the tire A (equal to or longer than 60,000 km)>the tire B (40,300 km)>the tire C (28,300 km)", which cannot be explained based on the rubber material data.

Figure 20B:
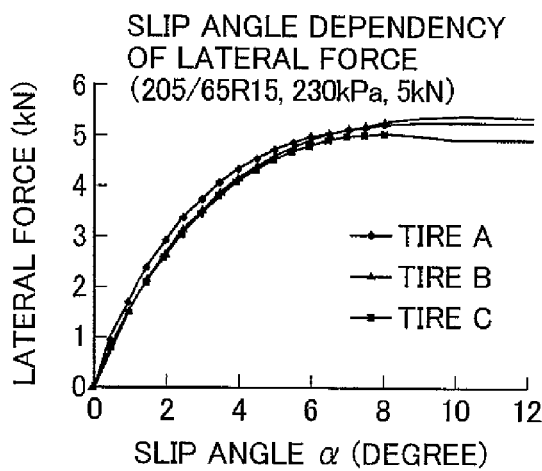
Figure 20C:
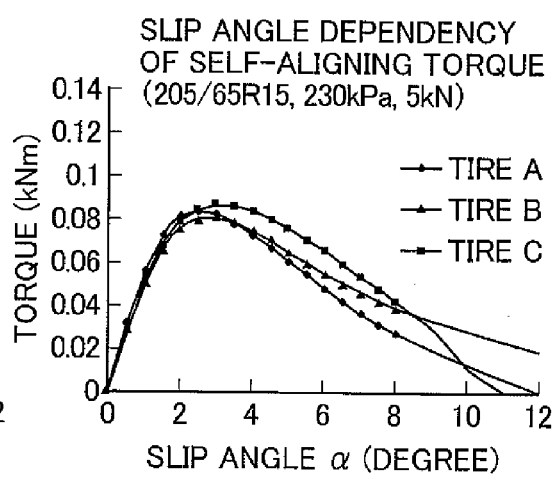
Figure 20D:
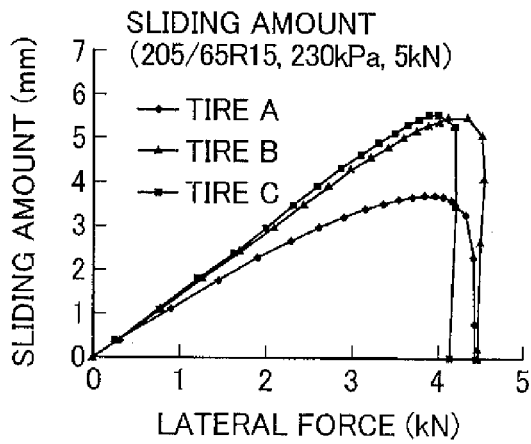

Nevertheless, in accordance with the present invention, as represented in FIG. 20D, since tire sliding amounts are calculated, abrasion characteristics of the tires can be predicted.

FIGS. 20B and 20C shows diagrams for showing characteristic curves of the slip angle dependency of both a lateral force and torque, which are measured in an indoor test. In these drawings, lateral forces and torque which correspond to characteristic curves are calculated by using the derived values of the tire dynamic element parameters, and the calculated lateral forces and torque are plotted by symbols ●, ▲, and ■. In any of the characteristic curves of the lateral force and the torque, the symbols of ●, ▲, and ■ are plotted on the characteristic curves. As a result, it can be seen that the values of the tire dynamic parameters are derived with high precision.

As indicated in FIG. 20D, as to tire sliding amounts which are calculated by using these derived parameter values, the sliding amount of the tire A is extremely small as compared with the sliding amounts of the tires B and C. The sliding amounts become smaller in an order of the tire A, the tire B, and the tire C. As a consequence, calculation results obtained by multiplying the tire sliding amounts by the index number of the above-mentioned breaking energy $E_b*T_b$ are given as "the tire A (abrasion characteristic: superior)>the tire B>the tire C (abrasion characteristic: inferior)". This is a prediction of the tire abrasion characteristic. This prediction result can explain the above-mentioned order of abrasion lifetimes which cannot be explained with the rubber material data of the rubber parts.

As previously explained, the tire dynamic element parameter values which constitute the tire dynamic model are derived from the characteristic curves, and the tire sliding amounts with respect to the road surface are calculated by using the derived parameter values, whereby the abrasion characteristics of the tires can be evaluated with high precision. Also, the values of the tire dynamic element parameters are amended, so the abrasion characteristics of the tires having the amended parameter values can be readily predicted.

As previously explained, the tire abrasion predicting method, the tire designing method, the tire manufacturing method, the tire abrasion predicting system, and the program according to the present invention have been described in detail. However, the present invention is not limited only to the above-mentioned embodiments, and may be modified and changed in various manners without departing from the technical scope of the present invention.

INDUSTRIAL APPLICABILITY

In the present invention, the tire sliding amount where the slip ratio is applied to the tire which rolls on the road surface to form the sliding region on the contact patch is calculated based on the tire dynamic model which is constituted by using a plurality of tire dynamic element parameters. Since the derived values of the tire dynamic element parameters reproduce the characteristic curves with high precision, the tire sliding amounts can also be predicted with high precision. As a consequence, the tire abrasion characteristics can be evaluated and predicted with high precision by using the tire sliding amounts to be predicted. In addition, by using this predicted result, the tire having the superior tire abrasion characteristic can be designed and manufactured.

The invention claimed is:

1. A tire abrasion predicting method for predicting an abrasion characteristic of a tire by calculating a tire sliding amount at a slip ratio applied to the tire rolling on a road surface so as to form a sliding region on a contact patch, the method including the steps of:
acquiring a characteristic curve of a tire axis force exerted on a tire rotation axis at the slip ratio applied to the tire, the tire axis force being changed depending upon the slip ratio;
deriving values of tire dynamic element parameters for determining the characteristic curve from the characteristic curve based on a tire dynamic model constituted by the tire dynamic element parameters;

calculating a tire sliding amount based on a sliding region, the sliding region and an adhesive region, which are formed on the contact patch of the tire at the applied slip ratio, being calculated by applying the values of the tire dynamic element parameters to the tire dynamic model; and predicting an abrasion characteristic of a tread part of the tire at the applied slip ratio by using the tire sliding amount in combination with abrasion characteristic data of a tread rubber of the tread part.

2. The tire abrasion predicting method according to claim 1, wherein the slip ratio includes at least one of a slip ratio which is caused by applying a slip angle to the tire, and a slip ratio in the braking/driving direction.

3. The tire abrasion predicting method according to claim 2, wherein the tire axis force is a lateral force which is exerted in a direction parallel to the tire rotation axis at the slip angle applied to the tire, and wherein in the step of acquiring the characteristic curve, a characteristic curve indicative of a slip angle dependency of self-aligning torque which is generated by the lateral force, is acquired in addition to the characteristic curve of the lateral force.

4. The tire abrasion predicting method according to claim 3, wherein the tire dynamic model is a model in which a lateral force at a slip angle applied to the tire is calculated and in which the self-aligning torque is divided into a lateral force-based torque component and a longitudinal force-based torque component and both of the components are respectively calculated, the lateral force-based torque component being generated by a lateral force executed on the contact patch of the tire and the longitudinal force-based torque component being generated by a longitudinal force exerted on the contact patch of the tire.

5. The tire abrasion predicting method according to claim 3, wherein when the values of the tire dynamic element parameters are derived, the values of the tire dynamic element parameters are derived in such a manner that a value of a combined sum of squared residuals becomes equal to or smaller than a predetermined value, in which the value of the combined sum of squared residuals is obtained by weighted summation of two sums of squared residuals by using weighting coefficients, one sum of the two sums of squared residuals being calculated between the characteristic curve of the lateral force and a curve corresponding to the lateral force calculated in the tire dynamic model and another sum of the two sums of squared residuals being calculated between the characteristic curve of the self-aligning torque and a curve corresponding to the self-aligning torque calculated in the tire dynamic model, and in which the weighting coefficients are obtained from variation information as to values, which are changed depending upon the slip angle, of the respective characteristic curves of the lateral force and the self-aligning torque.

6. The tire abrasion predicting method according to claim 2, wherein when the slip angle and the slip ratio in the braking/driving direction are applied to the tire, the tire axis force corresponds to the lateral force exerted in the direction parallel to the tire rotation axis, and the longitudinal force exerted in the direction perpendicular to the tire rotation axis, and in the step of acquiring the characteristic curve, a characteristic curve indicative of a slip angle dependency of the self-aligning torque generated by the lateral force and a characteristic curve indicative of a slip ratio dependency of the longitudinal force are acquired in addition to the characteristic curve of the slip angle dependency of the lateral force.

7. The tire abrasion predicting method according to claim 6, further including a step of calculating a tire sliding amount at a predetermined slip angle and a predetermined slip ratio in the braking/driving direction based on the tire dynamic model by using the derived values of the tire dynamic element parameters, and predicting a tread abrasion characteristic of the tire at the predetermined slip angle and the predetermined slip ratio in the braking/driving direction by using the calculated tire sliding amount.

8. The tire abrasion predicting method according to claim 7, wherein when the values of the tire dynamic element parameters are derived, the values of the tire dynamic element parameters are derived in such a manner that a value of a combined sum of squared residuals becomes equal to or smaller than a predetermined value, in which the value of the combined sum of squared residuals is obtained by weighted summation of three sums of squared residuals by using weight coefficients, the three sums of squared residuals being calculated between the characteristic curve of the longitudinal force and a curve corresponding to the longitudinal force calculated in the tire dynamic model, being calculated between the characteristic curve of the lateral force and a curve corresponding to the lateral force calculated in the tire dynamic model, and being calculated between the characteristic curve of the self-aligning torque and a curve corresponding to the self-aligning torque calculated in the tire dynamic model, respectively, and in which the weighting coefficients are obtained from variation information as to values, which are changed depending upon the slip angle, of the respective characteristic curves of the longitudinal force, the lateral force and the self-aligning torque.

9. The tire abrasion predicting method according claim 3, wherein when the values of the tire dynamic element parameters are derived from the characteristic curve based on the tire dynamic model, the values of the tire dynamic element parameters are derived by using an effective slip angle obtained by correcting a slip angle to be applied based on a torsional deformation of the tire generated by the self-aligning torque.

10. The tire abrasion predicting method according claim 1, wherein the derived values of the tire dynamic element parameters contain an adhesive friction coefficient and a sliding friction coefficient between the tread part of the tire and the road surface, and a shape defining coefficient defining a shape of a contact pressure distribution.

11. The tire abrasion predicting method according to claim 10, wherein the adhesive friction coefficient, the sliding friction coefficient, and the shape defining coefficient are derived by using at least one of a stiffness parameter with respect to a shear deformation of the tire, a stiffness parameter with respect to a lateral bending deformation of the tire, and a stiffness parameter with respect to a torsional deformation of the tire, which have been previously acquired.

12. The tire abrasion predicting method according to claim 2, wherein when the slip ratio in the braking/driving direction is applied to the tire, the tire axis force corresponds to the longitudinal force exerted in the direction perpendicular to the tire rotation axis, and in the step of acquiring the characteristic curve, a characteristic curve indicative of a slip ratio dependency of the longitudinal force is acquired.

13. A tire designing method for predicting an abrasion characteristic of a tire by calculating a tire sliding amount at a slip ratio applied to the tire rolling on a road surface so as to form a sliding region on a contact patch and for designing a tire by using a result of the predicting, the method including the steps of:

acquiring a characteristic curve of a tire axis force exerted on a tire rotation axis at the slip ratio applied to the tire, the tire axis force being changed depending upon the slip ratio;

deriving values of tire dynamic element parameters for determining the characteristic curve from the characteristic curve based on a tire dynamic model constituted by the tire dynamic element parameters;

calculating a tire sliding amount based on a sliding region, the sliding region and an adhesive region, which are formed on the contact patch of the tire at the applied slip ratio, being calculated by applying the values of the tire dynamic element parameters to the tire dynamic model;

predicting an abrasion characteristic of a tread part of the tire at the applied slip ratio by using the tire sliding amount in combination with abrasion characteristic data of a tread rubber of the tread part;

correcting values of tire dynamic element parameters in a case where a predicted result as to the abrasion characteristic of the tread part does not reach a target; and determining the values of the tire dynamic element parameters as a tire designing specification characteristic in a case where the predicted result of the abrasion characteristic of the tread part reaches the target.

14. The tire designing method according to claim 13, wherein the tire dynamic element parameters to be corrected include a stiffness parameter indicative of a stiffness in the tire dynamic model, and the tire designing method further including a step of designing a structural part of a tire based on the values of the tire dynamic element parameters which are determined as the tire designing specification characteristic.

15. The tire designing method according to claim 13, wherein the tire dynamic element parameters to be corrected include an adhesive friction coefficient or a sliding friction coefficient in the tire dynamic model, and the tire designing method further including a step of designing a rubber material part of a tire based on the values of the tire dynamic element parameters which are determined as the tire designing specification characteristic.

16. A tire manufacturing method that a tire is manufactured by using a structural part of the tire or a rubber part of the tire, which is determined by a tire designing method for predicting an abrasion characteristic of a tire by calculating a tire sliding amount at a slip ratio applied to the tire rolling on a road surface so as to form a sliding region on a contact patch and for designing a tire by using a result of the predicting, the tire designing method including the steps of:

acquiring a characteristic curve of a tire axis force exerted on a tire rotation axis at the slip ratio applied to the tire, the tire axis force being changed depending upon the slip ratio;

deriving values of tire dynamic element parameters for determining the characteristic curve from the characteristic curve based on a tire dynamic model constituted by the tire dynamic element parameters;

calculating a tire sliding amount based on a sliding region, the sliding region and an adhesive region, which are formed on the contact patch of the tire at the applied slip ratio, being calculated by applying the values of the tire dynamic element parameters to the tire dynamic model;

predicting an abrasion characteristic of a tread part of the tire at the applied slip ratio by using the tire sliding amount in combination with abrasion characteristic data of a tread rubber of the tread part;

correcting values of tire dynamic element parameters in a case where a predicted result as to the abrasion characteristic of the tread part does not reach a target; and determining the values of the tire dynamic element parameters as a tire designing specification characteristic in a case where the predicted result of the abrasion characteristic of the tread part reaches the target.

17. A tire abrasion predicting system for predicting an abrasion characteristic of a tire by calculating a tire sliding amount at a slip ratio applied to the tire rolling on a road surface to form a sliding region on a contact patch, which includes:

means for acquiring a characteristic curve of a tire axis force exerted on a tire rotation axis at the slip ratio applied to the tire, the tire axis force being changed depending upon the slip ratio;

means for deriving values of tire dynamic element parameters for determining the characteristic curve from the characteristic curve of the tire axis force based on the tire dynamic model, the tire dynamic model constituted by the tire dynamic element parameters;

means for calculating an adhesive region and a sliding region by applying the values of the tire dynamic element parameters to the tire dynamic model, the regions formed on the contact patch of the tire at the applied slip ratio, and for calculating a tire sliding amount from the sliding region; and means for predicting an abrasion characteristic of a tread part of the tire at the applied slip ratio by using the tire sliding amount in combination with abrasion characteristic data of a tread rubber of the tread part.

18. A computer readable medium having a program stored thereon for executing a computer to perform a method for predicting an abrasion characteristic of a tire by calculating a tire sliding amount at a slip ratio applied to the tire rolling on a road surface to form a sliding region on a contact patch, the method comprising:

acquiring a characteristic curve of a tire axis force exerted on a tire rotation axis at the slip ratio applied to the tire, the tire axis force being changed depending upon the slip ratio, and causing a memory of the computer to store the acquired characteristic curve;

deriving values of tire dynamic element parameters for determining the characteristic curve from the characteristic curve of the tire axis force stored in the memory based on the a dynamic model constituted by the tire dynamic element parameters;

applying the derived values of the tire dynamic element parameters to the tire dynamic model to acquire both an adhesive region and a sliding region, which are formed on the contact patch of the tire at the applied slip ratio;

calculating a tire sliding amount from the sliding region; and predicting an abrasion characteristic of a tread part of the tire at the applied slip ratio by using the tire sliding amount in combination with abrasion characteristic data of a tread rubber of the tread part.

* * * * *